US006903486B2

(12) United States Patent
Jerman et al.

(10) Patent No.: US 6,903,486 B2
(45) Date of Patent: Jun. 7, 2005

(54) BALANCED MICRODEVICE

(75) Inventors: John H. Jerman, Palo Alto, CA (US); John D. Grade, Mountain View, CA (US)

(73) Assignee: Iolon, Inc., San Jose, CA (US)

( * ) Notice: Subject to any disclaimer, the term of this patent is extended or adjusted under 35 U.S.C. 154(b) by 0 days.

(21) Appl. No.: 10/251,035

(22) Filed: Sep. 19, 2002

(65) Prior Publication Data

US 2003/0080648 A1 May 1, 2003

Related U.S. Application Data

(63) Continuation-in-part of application No. 09/727,794, filed on Nov. 29, 2000, now Pat. No. 6,469,415.
(60) Provisional application No. 60/323,628, filed on Sep. 19, 2001, provisional application No. 60/234,042, filed on Sep. 20, 2000, provisional application No. 60/227,933, filed on Aug. 25, 2000, provisional application No. 60/174,562, filed on Jan. 5, 2000, and provisional application No. 60/167,951, filed on Nov. 29, 1999.

(51) Int. Cl.$^7$ .................................................. H02N 1/00
(52) U.S. Cl. ....................... 310/309; 359/224; 359/225; 369/44.32; 369/44.16; 360/294.5
(58) Field of Search ................... 310/309; 359/223–226, 359/198, 872; 385/16, 18, 22; 360/294.5, 294.2; 369/44.16, 44.18, 44.32

(56) References Cited

U.S. PATENT DOCUMENTS

| 4,764,002 A | * | 8/1988 | Wilson ........................ 359/225 |
| 5,000,534 A | | 3/1991 | Watanabe et al. ........... 350/96.2 |
| 5,025,346 A | | 6/1991 | Tang et al. ..................... 36/283 |
| 5,153,870 A | | 10/1992 | Lee et al. .................... 369/111 |
| 5,319,668 A | | 6/1994 | Luecke ........................ 372/107 |

(Continued)

FOREIGN PATENT DOCUMENTS

| EP | 0924821 A1 | 6/1999 | .......... H01S/3/085 |
| EP | 0952643 A2 | 10/1999 | ............. H01S/3/85 |
| EP | 0 849 846 B1 | 9/2001 | ............. H01S/5/14 |
| JP | 03-196791 | 8/1991 | ........... H04N/9/78 |
| JP | 06-160750 | * 6/1994 | .......... G02B/26/08 |
| JP | 06-188497 | 7/1994 | ........... H01S/3/105 |
| JP | 2000-338430 | * 12/2000 | .......... G02B/26/08 |
| WO | WO 99/37013 | 7/1999 | ............. H02N/1/00 |
| WO | WO 00/36447 | 6/2000 | ............. G02B/6/35 |
| WO | WO 00/36740 | 6/2000 | ............. H02N/1/00 |
| WO | WO 00/62410 | 10/2000 | ............. H02N/1/00 |

OTHER PUBLICATIONS

Japanese Abstract Only, 06188497, Dec. 1992.*
Japanese Abstract Only, 09318888, Dec. 1997.*
Japanese Abstract Only, 10178240, Jun. 1998.*
V.R. Dhuler, et al.; "A Novel Two Axis Actuator for High Speed Large Angular Rotation", TRANDUCERS '97, 1997 International Conference on Solid–State Sensors and Actuators, Chicago, Jun. 16–19, 1997 IEEE, pp. 327–330.
Fan et al., "Electrostatic Microactuator and Design Considerations for HDD Applications", IEEE Transactions on Magnetics, vol. 35, No. 2, Mar. 1999, pp. 1000–1005.

(Continued)

*Primary Examiner*—Karl Tamai
(74) *Attorney, Agent, or Firm*—Dorsey & Whitney LLP

(57) ABSTRACT

A balanced microdevice comprising a substrate, a movable structure overlying the substrate, an element and a lever assembly having a pivot and a lever coupled to and pivotable about the pivot. The lever has a first extremity coupled to the movable structure and an opposite second extremity coupled to the element. The movable structure causes the lever to pivot about the pivot so as to move the element in a direction of travel. The element is substantially mechanically balanced to inhibit undesirable movement of the element in the direction of travel in response to externally applied forces.

24 Claims, 11 Drawing Sheets

U.S. PATENT DOCUMENTS

| | | | |
|---|---|---|---|
| 5,446,811 A | 8/1995 | Field et al. | 385/23 |
| 5,742,712 A | 4/1998 | Pan et al. | 385/18 |
| 5,748,812 A | 5/1998 | Buchin | 385/18 |
| 5,771,252 A | 6/1998 | Lang et al. | 372/20 |
| 5,850,375 A | 12/1998 | Wilde et al. | 369/14 |
| 5,867,512 A | 2/1999 | Sacher | 372/20 |
| 5,982,585 A | 11/1999 | Fan et al. | 360/104 |
| 5,982,794 A | 11/1999 | Tamura | 572/38 |
| 5,986,381 A | 11/1999 | Hoen et al. | 310/309 |
| 5,998,906 A | 12/1999 | Jerman et al. | 310/309 |
| 6,073,484 A | 6/2000 | Miller et al. | 73/105 |
| 6,134,207 A | 10/2000 | Jerman et al. | 369/112 |
| 6,301,403 B1 | 10/2001 | Heanue et al. | 385/18 |

OTHER PUBLICATIONS

L.A. Field, et al.; "Micromachined 1×2 Optical–fiber Switch", Sensors and Actuators A 53, Jan. 1996 Elsevier Science S.A., pp. 311–315.

D.A. Horsley, et al.; "Angular Micropositioner for Disk Drives", Jan. 1997 IEEE pp 454–458.

IBM Technical Disclosure Bulletin, "Shock–Resistant Rotary Microactuator for Fine Positioning of Recording Heads," vol. 37, No. 8, Aug. 1994, pp. 401–403.

T. Juneau, et al.; "Dual Axis Operation of a Micromachined Rate Gyroscope", TRANDUCERS '97, International Conference on Solid State Sensors and Actuators, Chicago Jun. 1997 IEEE, pp 883–890.

M. Kiang, et al.; "Surface–micromachined Electrostatic– Comb Driven Scanning Micromirrors for Barcode Scanners", Jun. 1996 IEEE, pp. 192–197.

E.H. Klaassen, et al.; "Silicon Fusion Bonding and Deep Reactive Ion Etching; A New Technology for Microstructures", Transducers '95– Eurosensors, International Conference on Solid–State Sensors and Actuators, and Eurosensors IX, Stockholm, Sweden, Jun. 25–29, 1995, pp 556–559.

S. Kurth, et al.; "Silicon Mirrors and Micromirror Arrays for Spatial Laser Beam Modulation", Sensors and Actuators A66, Jan. 1998 Elsevier Science S.A., pp 76–82.

J. Mohr, et al.; "Micro Optical Switching by Electrostatic Linear Actuators with Large Displacements", The $7^{th}$ International Conference on Solid–State Sensors and Actuators, pp 120–123, Jan. 1993.

W.C. Tang, et al.; "Laterally Driven Polysilicon Resonant Microstructures", Sensors Actuators 20, Mar. 1989 IEEE pp. 53–59.

L.S. Fan, et al.; "Batch–Fabricated Area–Efficient Milli– Actuators" Proceedings 1994 Solid State Sensor and Actuator Workshop, Hilton Head, South Carolina, Jun. 13–16, 1994, 1994 TRF pp 38–42.

* cited by examiner

BALANCED MICRODEVICE

CROSS-REFERENCE TO RELATED APPLICATION

This application claims priority to U.S. provisional patent application Ser. No. 60/323,628 filed Sep. 19, 2001 and is a continuation-in-part of U.S. patent application Ser. No. 09/727,794 filed Nov. 29, 2000, now U.S. Pat. No. 6,469,415, which claims priority to U.S. provisional patent application Ser. No. 60/167,951 filed Nov. 29, 1999; U.S. provisional patent application Ser. No. 60/174,562 filed Jan. 5, 2000; U.S. provisional patent application Ser. No. 60/227,933 filed Aug. 25, 2000 and U.S. provisional patent application Ser. No. 60/234,042 filed Sep. 20, 2000, the entire contents of each of which are incorporated herein by this reference.

FIELD OF THE INVENTION

The present invention is applicable to the field of microdevices and is more specifically applicable to electrostatic microdevices.

BACKGROUND

Microactuators, and particularly electrostatic microactuators, have heretofore been provided. See, for example, U.S. Pat. No. 5,998,906 and International Publication Number WO 00/36740. Such microactuators can be utilized in microdevices, for example in the telecommunications industry and in the data storage industry, for moving optical elements. See, for example, International Publication Number WO 00/36447 and U.S. Pat. No. 6,134,207. It has been found that applied external accelerations can undesirably effect the performance of microdevices employing microactuators.

What is needed, therefore, is a microdevice that is substantially mechanically balanced such that an element moved thereby does not appreciably move when subjected to external accelerations.

What is also needed is a rotary electrostatic microactuator that rotates about a pivot point disposed outside the confines of the microactuator.

SUMMARY OF THE INVENTION

In general, a balanced microdevice is provided that includes a substrate and at least one comb drive assembly having first and second comb drive members. The first comb drive member is mounted on the substrate and the second comb drive member overlies the substrate. At least one spring member is provided that has a first end portion coupled to the substrate and a second end portion coupled to the second comb drive member. The first comb drive member has a plurality of spaced-apart first comb drive fingers and the second comb drive member has a plurality of spaced-apart second comb drive fingers. The second comb drive member is movable between a first position in which the first and second comb drive fingers are not substantially fully interdigitated and a second position in which the first and second comb drive fingers are substantially fully interdigitated. A counterbalance is carried by the substrate and coupled to the second comb drive member for inhibiting undesirable movement of the second comb drive member in response to externally applied accelerations to the microdevice.

In one embodiment, a microdevice is provided that includes a substrate, a movable structure overlying the substrate, an element and a lever assembly having a pivot and a lever coupled to and pivotable about the pivot. The lever has a first extremity coupled to the movable structure and an opposite second extremity coupled to the element. The movable structure causes the lever to pivot about the pivot so as to move the element in a direction of travel. The element is substantially mechanically balanced to inhibit undesirable movement of the element in the direction of travel in response to externally applied forces.

BRIEF DESCRIPTION OF THE DRAWINGS

The accompanying drawings, which are somewhat schematic in many instances and are incorporated in and form a part of this specification, illustrate several embodiments of the invention and, together with the description, serve to explain the principles of the invention.

DETAILED DESCRIPTION OF THE INVENTION

Figure 1:
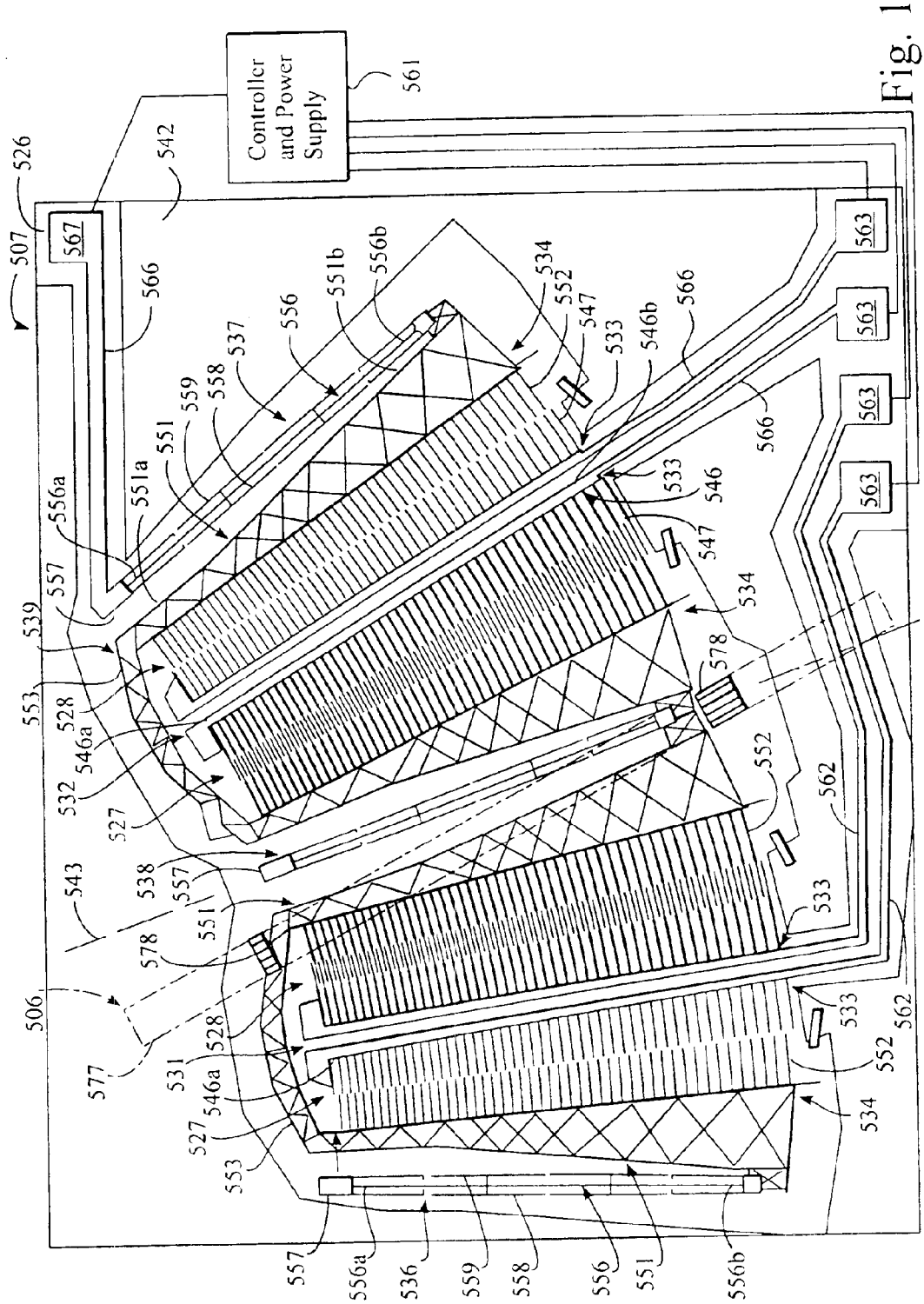
FIG. 1 is a plan view of an electrostatic microactuator.

In general, microactuator or motor 507 shown in FIG. 1 is a MEMS-based microactuator capable of being used in a microdevice such as tunable laser of the type disclosed in copending U.S. patent application Ser. No. 09/728,212 filed Nov. 29, 2000, the entire content of which is incorporated herein by this reference. Microactuator 507 is a of a rotary or angular electrostatic microactuator formed from a substrate 526 that extends substantially in a plane. A plurality of first and second comb drive assemblies 527 and 528 are carried by substantially planar substrate 526 and are arranged on the substrate in first and second sets 531 and 532. Each of the first and second comb drive assemblies includes a first comb drive member or comb drive 533 mounted on substrate 526 and a second comb drive member or comb drive 534 overlying the substrate 526. At least first and second spaced-apart suspension members or spring members are included in microactuator 507 for supporting or suspending second comb drives 534 over the substrate 526 and for providing radial stiffness to the movable second comb drives 534. As shown, first and second outer suspension members or springs 536 and 537 and a central suspension member or spring 538 are provided. Second comb drives 534 are part of a movable structure 539 overlying the substrate 526. Any suitable movable element such as an optical element 506 can be mounted on movable structure 539 for movement relative to substrate 526. The optical element 506, as shown in FIG. 1, is a microreflector.

Substrate 526 is made from any suitable material such as silicon and is preferably formed from a silicon wafer having a thickness ranging from 400 to 600 microns and preferably approximately 400 microns. Springs 536–537, first and second comb drive assemblies 527 and 528 and the remainder of movable structure 539 are formed atop the substrate 526 by a second or top layer 542 made from a wafer of any suitable material such as silicon. Top layer or wafer 542 has a thickness ranging from 10 to 200 microns and preferably approximately 85 microns and is preferably fusion bonded to the substrate 526 by means of a silicon dioxide layer (not shown). The components of microactuator 507 are preferably etched from wafer 542 by deep reactive ion etching (DRIE) techniques or the Lithographie Gavanometrie and Abformung (LIGA) process, which permit such structures to have a high aspect ratio and thus enhance the out-of-plane stiffness of such structures. Springs 536–538 and movable structure 539 are spaced above the substrate 526 by an air gap (not shown), that ranges from 3 to 30 microns and preferably approximately 15 microns so as to be electrically isolated from the substrate 526.

First and second sets 531 and 532 of comb drive assemblies are symmetrically disposed about a radial centerline 543 of microactuator 507 and each include a first comb drive assembly 527 and a second comb drive assembly 528. Second comb drive assembly 528 of the first set 531 is disposed adjacent centerline 543 and first second comb drive assembly 527 of the second set 532 is disposed adjacent the centerline 543. A first comb drive assembly 527 is spaced farthest from centerline 543 in the first set 531 and a second comb drive assembly 528 is spaced farthest from the centerline in the second set 532. Each of the comb drive assemblies 527 and 528 is centered along a radial line which intersects radial centerline 543 at the virtual pivot point (not shown) of microactuator 507. Each of the first and second comb drive assemblies 527 and 528 has a length ranging from 300 to 3000 microns and preferably approximately 1300 microns, and commences a radial distance from the pivot point of microactuator 507 ranging from 500 to 5000 microns and preferably approximately 2000 microns.

First comb drive 533 of each of first and second comb drive assemblies 527 and 528 is immovably secured to substrate 526. Each comb drive 533 has a radially-extending bar or truss 546 provided with a first or inner radial portion 546a and a second or outer radial portion 546b. A plurality of comb drive fingers 547 extend from one side of bar 546 in radially spaced-apart positions along the length of the bar. Comb drive fingers or comb fingers 547 can be of any suitable shape and are preferably approximately arcuate in shape. Comb fingers 547 extend perpendicularly from bar 546 and thereafter substantially arc along a radius that preferably commences at the axis of rotation or virtual pivot point of microactuator 507. In a preferred embodiment, piecewise linear segments are used to form the comb fingers 547 for approximating such an arcuate shape.

Second comb drives 534 are spaced above substrate 526 so as to be movable relative to the substrate and first comb drives 533. The second comb drives 534 have a construction similar to first comb drives 533 and, more specifically, are formed with a radially-extending bar or truss 551 having a first or inner radial portion 551a and a second or outer radial portion 551b. A plurality of comb drive fingers or comb fingers 552 extend from one side of bar 551 in radially spaced-apart positions along the length of the bar 551. Comb fingers 552 are substantially similar in construction and size to comb fingers 547 of the related comb drive assembly 527 or 528. Movable comb fingers 552 of each second comb drive 534 are offset relative to the respective stationary comb fingers 547 so that comb fingers 552 can interdigitate with comb fingers 547 when the second comb drive 534 is pivoted about the virtual pivot point or pivot point of microactuator 507 towards the respective first comb drive 533.

The inner radial portions 551a of the two second comb drive bars 551a in each of the first and second sets 531 and 532 of comb drive assemblies are rigidly interconnected by a connector bar or beam 553 that extends radially inside the respective first comb drives 533 of such set 531 or 532. The outer radial portions 551b of second comb drive assembly 528 in first set 531 and of first comb drive assembly 527 in second set 532 are rigidly interconnected so that the second comb drives 534 in microactuator 507 move in unison about the pivot point of such microactuator. Movable structure 539 includes second comb drives 534 and first and second connector beams 553 and has a thickness ranging from 15 to 200 microns and preferably approximately 85 microns.

Means including spaced-apart first and second outer springs 536 and 537 and optional central spring 538 are included within rotary electrostatic microactuator 507 for movably supporting second comb drives 534 and the remainder of movable structure 539 over substrate 526. First and second outer springs 536 and 537 are symmetrically disposed about radial centerline 543 and central spring 538 extends between first and second sets 531 and 532 of comb drive assemblies. Each of the springs 536–538, when in its rest position as shown in FIG. 1, is centered on a radial line extending through the virtual pivot point of microactuator 507. Central spring 538 extends along radial centerline 543. The springs are spaced approximately 20 to 30 degrees apart about the virtual pivot point of microactuator 507.

Each of the springs 536–538 is formed from a single beam-like spring member 556 having a first or inner radial end portion 556a and a second or outer radial end portion 556b. The inner radial end portion 556a of the spring member 556 is secured or coupled to substrate 526 at an anchor 557. The balance of the spring member 556 is spaced above the substrate by an air gap. The outer radial end portion 556b of outer springs 536 and 537 is secured or coupled to the outer radial extremity of the adjacent second comb drive bar 551 and the outer radial end portion 556b of central spring 538 is secured or coupled to the outer radial extremity of the adjacent second comb drive bars 551 forming the inner boundary of each of first and second sets 531 and 532 of comb drive assemblies. Each of the spring members 556 has a length ranging from 300 to 3000 microns and preferably approximately 1000 microns and has a width ranging from one to 20 microns and preferably approximately five microns. First and second elongate sacrificial bars 558 and 559 of the type described in U.S. Pat. No. 5,998,906 extend along opposite sides of each spring member 556 for ensuring even etching and thus the desired rectangular cross section of the spring member 556. Springs 536–538 each have a thickness similar to movable structure 539 and preferably the same as movable structure 539. Although three springs 536–538 are disclosed for microactuator 507, it should be appreciated that two such springs or greater than three such springs can be provided. In addition, although first and second comb drive assemblies 527 and 528 are shown and described as being disposed between outer springs 536 and 537, some or all of such comb drive assemblies 527 and 528 can be disposed outside of the springs 536 and 537.

Each of the second comb drives 534 of first and second comb drive assemblies 527 and 528 is movable in a first direction of travel about the pivot point of microactuator 507 between a first or intermediate position in which comb fingers 547 and 552 of the comb drive assembly are not substantially fully interdigitated and a second position in which such comb fingers 547 and 552 are substantially fully interdigitated. Each of the comb drive assemblies 527 and 528 is shown in FIG. 1 in the first position in which the comb fingers 547 and 552 of each comb drive assembly 527 and 528 are not substantially fully interdigitated. More specifically, comb fingers 547 and 552 of the second comb drive assembly 528 in first set 531 and of the first comb drive assembly 527 in second set 532 are partially interdigitated while in the first position and comb fingers 547 and 552 of the first comb drive assembly 527 in first set 531 and of the second comb drive assembly 528 in second set 532 are not interdigitated while in the first position. It can thus be seen that although comb fingers 547 and 552 can be partially interdigitated when a second comb drive 534 is in its first position, the comb fingers can alternatively be disengaged and thus not interdigitated when the second comb drive is in its first position. When in their second position, movable comb fingers 552 extend between respective stationary comb fingers 547. The movable comb fingers 552 approach but preferably do not engage stationary bar 546 of the respective first comb drive 533 and, similarly, the stationary comb fingers 547 approach but preferably do not engage movable bar 551 of the respective second comb drive 534.

Each of the second comb drives 534 of first and second comb drive assemblies 527 and 528 is also movable in a second direction of travel about the pivot point of microactuator 507 from the intermediate position shown in FIG. 1 to a third position in which the comb fingers 547 and 552 are spaced apart and fully disengaged (not shown). When comb fingers 547 and 552 of one comb drive assembly 527 or 528 in a set 531 or 532 are in the first position, the comb fingers of the other comb drive assembly 527 or 528 are in the third position. Thus each second comb drive 534 is movable between the second position, in which comb fingers 547 and 552 are substantially fully interdigitated, to the first or intermediate position, in which the comb fingers are not substantially fully interdigitated, to the third position, in which the comb fingers are fully disengaged and spaced apart.

Electrical means is included for driving the second comb drives 534 between their first and second positions. Such electrical means includes a suitable controller and preferably a controller and voltage generator 561 that is electrically connected to the first and second comb drives 533 and 534 of microactuator 507. In this regard, the outer radial end portion 546b of each first comb drive bar 546 is electrically connected by means of a lead 562 to a bond pad 563 provided on a side of microactuator 507. Movable structure 539 is electrically connected by a lead 566 to a bond pad 567 also provided on a side of substrate 526. The lead 566 extends from such bond pad 567 to inner radial portion 556a of second spring 536. The bond pads 563 and 567 are electrically coupled by suitable wires or leads 568 to controller and power supply 561.

Means in the form of a closed loop servo control can optionally be included in controller 561 or related control electronics for monitoring the position of movable structure 539 relative to substrate 526. For example, controller 561 can include a conventional algorithm for measuring the capacitance between comb fingers 552 of movable comb drives 534 and comb fingers 547 of the stationary comb drives 533. A signal separate from the drive signal to the comb drive members can be transmitted by the controller to the microactuator for measuring such capacitance. Such a method does not require physical contact between the comb drive fingers. The position of optical element 506 can be calibrated to the capacitance of the microactuator 507 and thus the position of the optical element can be monitored and controlled. This method of servo control can be implemented at low cost and does not require extra optical components.

The structural components of microactuator 507, that is movable structure 539, springs 536–538 and first comb drives 533, have the shape of a truncated fan when viewed in plan (see FIG. 1). In this regard, such components resemble a truncated or foreshortened sector of a circle, that is such components do not extend to the virtual pivot point of microactuator 507 but instead are spaced radially outwardly from such virtual pivot point. As such, the virtual pivot point of microactuator 507 intersects the plane of substrate 526 at a point outside the confines of the components of such actuator and more specifically outside the confines of movable structure 536. Springs 536 and 537 and movable structure 539 subtend an angle about the virtual pivot point of microactuator 507 of less than 180° and preferably less than 90°. In the specific embodiment of microactuator 507 shown in FIG. 1 and discussed above, springs 536 and 537 and movable structure 539 subtend an angle of approximately 45 degrees about such virtual pivot point.

In operation and use, movable structure 539 is movable about the virtual pivot point of microactuator 507 in opposite first and second angular directions from its at rest or intermediate position shown in FIG. 1. When movable structure 539, and thus reflector 506, moves in a counter-clockwise direction about such virtual pivot point, second comb drives 534 of the second comb drive assembly 528 in each of the first and second sets 531 and 532 move to their respective second positions so that comb fingers 547 and 552 of the second comb drive assemblies 528 are substantially fully interdigitated. When movable structure 531 is moved in a clockwise direction about the virtual pivot point of microactuator 507, second comb drives 534 of the first comb drive assembly 527 in each of the first and second sets 531 and 532 move to their respective second positions so that comb fingers 547 and 552 of the first comb drive assemblies 527 are substantially fully interdigitated. Springs 536–538 provide radial rigidity to movable structure 539 for inhibiting snap over of the interdigitated comb fingers 547 and 552. Springs 536–538 provide radial rigidity to movable structure 539 for inhibiting snap over of comb fingers 547 and 552.

When it is desired to rotate movable structure 539 and thus reflector 506 in a clockwise direction about the virtual pivot point of microactuator 507, in one preferred method a voltage potential is supplied by controller 561 to stationary comb drives 533 of first drive assemblies 527 so as to cause comb fingers 552 of the respective movable comb drives 534 to be electrostatically attracted to comb fingers 547 of the stationary comb drives 533. Such attraction force causes comb fingers 552 to move towards and interdigitate with comb fingers 547. The amount of such interdigitation, and thus the amount movable structure 539 and reflector 506 pivot about the virtual pivot of microactuator 507, can be controlled by the amount of voltage supplied to the stationary comb drives 533 of the first comb drive assemblies 527. When it is desired to pivot movable structure 539 and reflector 506 in a counterclockwise direction about the virtual pivot axis of microactuator 507, a suitable voltage potential can be supplied to stationary comb drives 533 of second comb drive assemblies 528 so as to cause comb fingers 552 of the respective movable comb drives 534 to move towards and interdigitate with comb fingers 547 of the second comb drive assemblies 528. As can be seen, the second comb drives 534 of one of first comb drive assemblies 527 or second comb drive assemblies 528 are in their second positions when the second comb drives 534 of the other of second comb drive assemblies 528 or first comb drive assemblies 527 are in their first positions.

Suitable voltage potentials to drive comb drive assemblies 527 and 528 can range from 20 to 200 volts and preferably range from 60 to 150 volts. Microactuator 507 is capable of a +/−1.5 degrees of pivotable rotation about the virtual pivot point of the microactuator 507, that is rotational movement of 1.5 degrees in both the clockwise and the counterclockwise directions for an aggregate pivotal movement of three degrees when drive voltages of 120 or 140 volts are utilized. The amount of a angular deflection of movable structure 539 about such virtual pivot point is dependent on the number of comb fingers 547 and 552, the electrostatic gap between the comb fingers and the length and width of springs 536–538.

Radially-extending springs 536–538 provide radial rigidity and stiffness to movable second comb drives 534 and thus inhibit snap over of the comb fingers 547 and 552 during interdigitation. The nonfolded design of springs 536–538 enhances out-of-plane stiffness, that is stiffness in microactuator 507 that is out of the plane of movable structure 539. Such out-of-plane stiffness facilitates support of the relatively large reflector 506 and inhibits misalignments between the reflector 506 and diffraction grating 504 during operation of microactuator 507.

Microdevices incorporating microactuators, like microactuator 507, can be provided that are balanced so that the movable portions of such actuators, and elements or objects moved thereby, are not undesirably moved when external accelerations or forces are applied to the device. An embodiment of such microdevice is shown in FIGS. 2–8. Balanced apparatus or microdevice 652 shown therein includes at least one microactuator coupled to a movable member or element, such as microreflector 506, for moving such element and more specifically for pivoting the microreflector 506. The microdevice is balanced to inhibit undesirable movement of the reflector 506 from externally applied accelerations to the device and can be used in any suitable application such as in a tunable laser. In one preferred embodiment, the balanced microdevice 652 includes a first microactuator or motor 653 which is preferably a MEMS-based microactuator of any suitable type and more preferably an electrostatic microactuator similar to microactuator 507 described above. Like reference numerals have been used to describe like components of microactuators 507 and 653.

Figure 2:
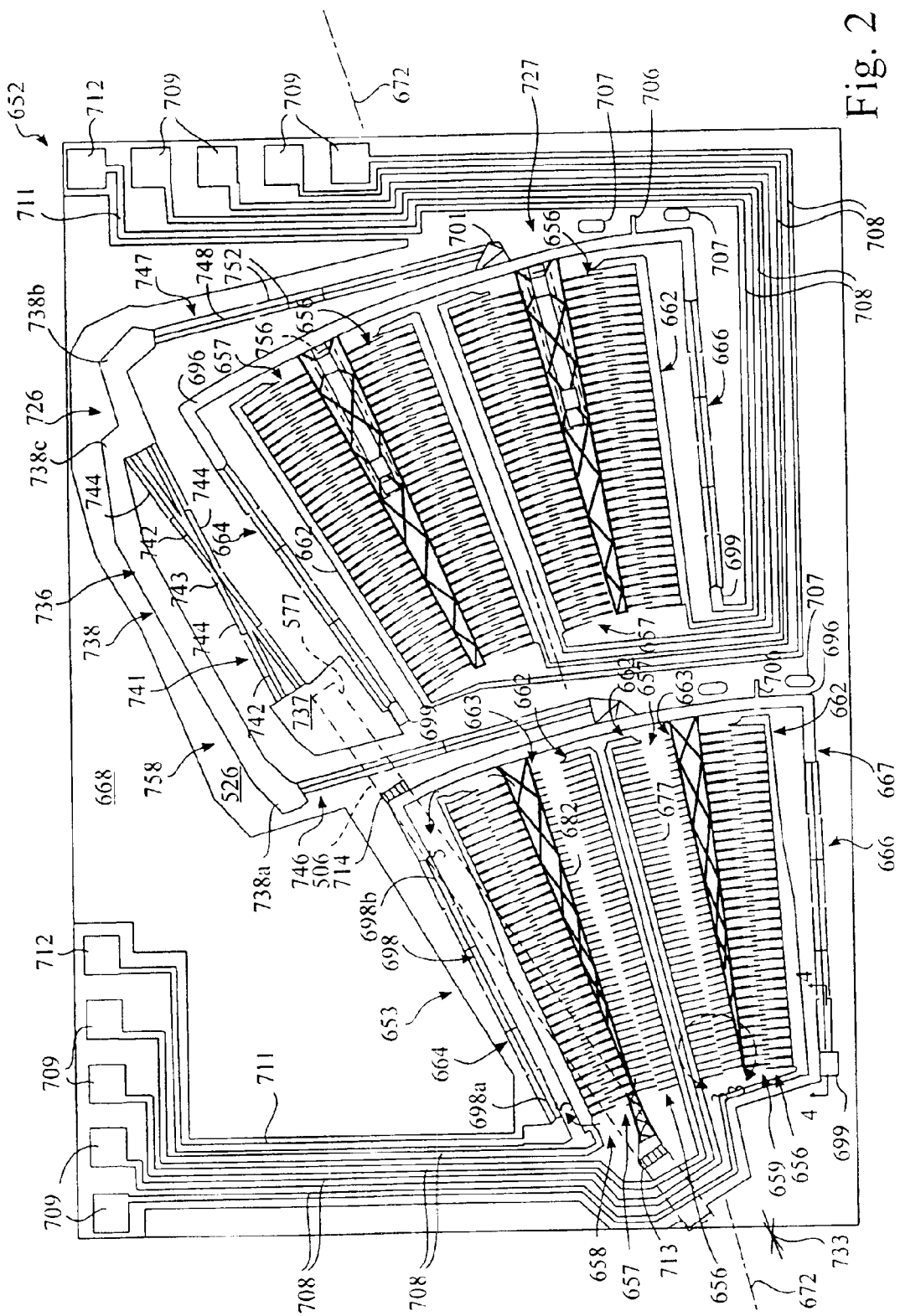
FIG. 2 is a plan view of a balanced microdevice of the present invention utilizing an electrostatic microactuator.
Figure 6:
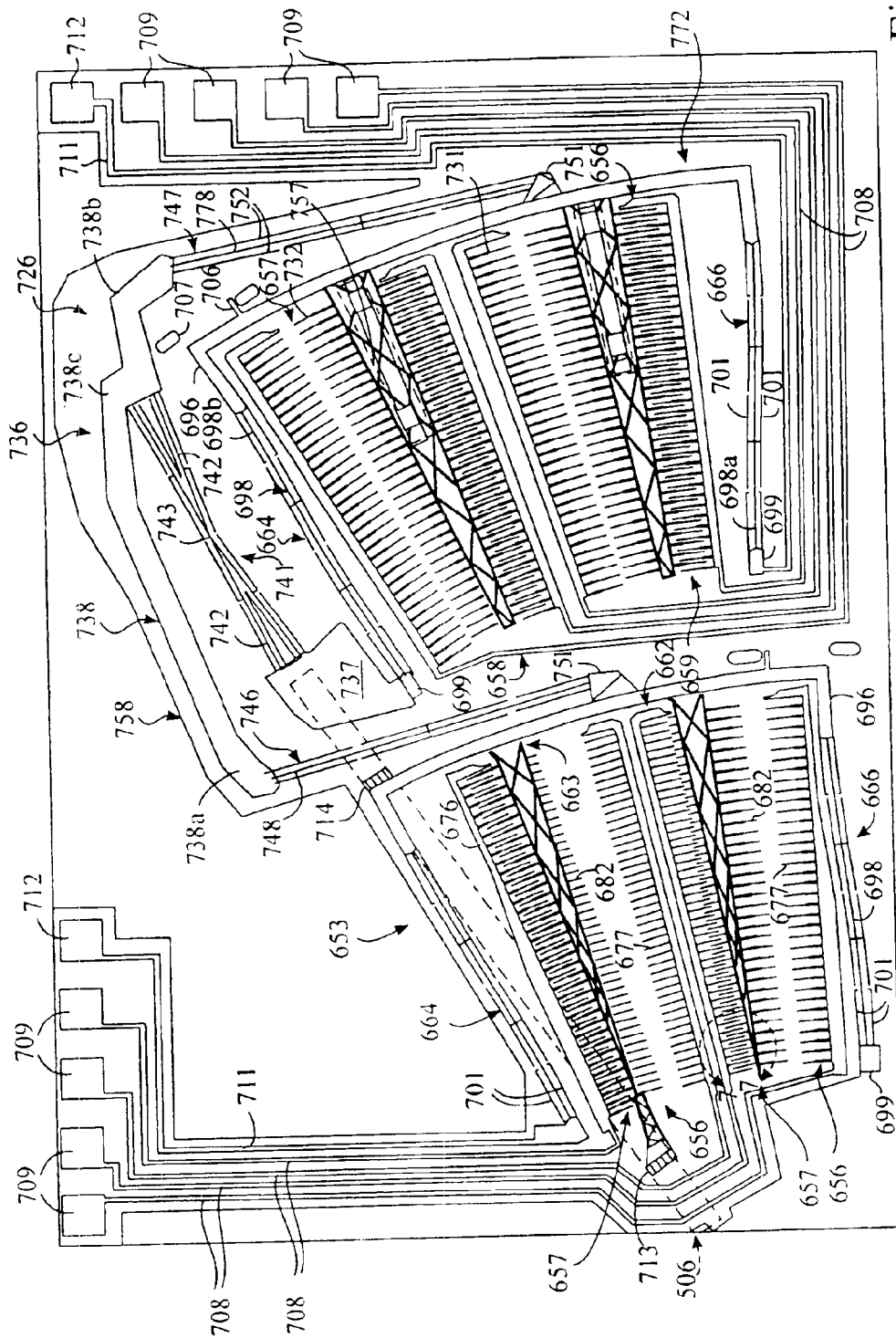
FIG. 6 is a plan view of the balanced microdevice of FIG. 2 in a second position.

Microactuator 653 has at least one and preferably a plurality of first and second comb drive assemblies 656 and 657 carried by substantially planar substrate 526 and arranged on the substrate in first and second sets 658 and 659 (see FIGS. 2 and 6). Each of the first and second comb drive assemblies includes a first comb drive member or comb drive 662 mounted on substrate 526 and a second comb drive member or comb drive 663 overlying the substrate. At least first and second spaced-suspension beams or spring members 664 and 666 are included in microactuator 653 for supporting or suspending second comb drives 663 over the substrate 526 and for providing radial stiffness to the movable second comb drives 663. The second comb drives 663 are part of a movable portion or structure 667 overlying the substrate 526.

First and second comb drive assemblies 662 and 663, first and second springs 664 and 666 and the remainder of movable structure 667 are formed atop substrate 526 by a second or top layer 668 made from a wafer of any suitable material such as silicon. Top layer or wafer 668 has a thickness ranging from 10 to 200 microns and preferably approximately 85 microns and is preferably fusion bonded to the substrate 526 by means of a silicon dioxide layer 669 (see FIG. 4). The components of microactuator 653 are preferably etched from top wafer 668 by any suitable technique and preferably by the techniques discussed above with respect to microactuator 507. Springs 664 and 666 and movable structure 667 are spaced above the substrate 526 by an air gap 671 that ranges from 3 to 30 microns and preferably approximately 15 microns, so as to be electrically isolated from the substrate 526.

First and second sets 658 and 659 of comb drive assemblies are symmetrically disposed about a radial centerline 672 of microactuator 653 and each include a first comb drive assembly 656 and a second comb drive assembly 657 (see FIG. 2). First comb drive assembly 656 of the first set 658 and second comb drive assembly 657 of the second set 659 are disposed adjacent centerline 672. A second comb drive assembly 657 is spaced away from the centerline 672 in the first set 658 and a first comb drive assembly 656 is spaced away from the centerline in the second set 659 so as to be adjacent the respective sides of microactuator 653. Each of the first and second comb drive assemblies 656 and 657 has a length ranging from 300 to 3000 microns and preferably approximately 1300 microns, and commences a radial distance ranging from 500 to 5000 microns and preferably approximately 2000 microns from the pivot point of microactuator 653.

First comb drive 662 of each of first and second comb drive assemblies 656 and 657 is immovably secured to substrate 526. Each first comb drive 662 has a radially-extending truss or bar 676 provided with a first or inner radial portion 676a and second or outer radial portion 676b (see FIGS. 5 and 8). A plurality of first comb drive fingers or comb fingers 677 extend from one side of bar 676 in radially spaced-apart positions along the length of the bar. Comb fingers 677 can be of any suitable shape and are preferably approximately arcuate in shape. In a preferred embodiment, piecewise linear segments are used to form comb fingers 677 for approximating such an arcuate shape.

Second comb drives 663 are spaced above substrate 526 so as to be movable relative to the substrate and first comb drives 662. The second comb drives 663 have a construction similar to first comb drives 662 and, more specifically, are formed with a radially-extending truss or bar 681 having a first or inner radial portion 681a and a second or outer radial portion 681b (see FIGS. 5 and 8). A plurality of second comb drive fingers or comb fingers 682 extend from one side of bar 681 in radially spaced-apart positions along the length of the bar 681. Comb fingers 682 are substantially similar in construction in size to comb fingers 677 of the related comb drive assembly 656 or 657. In each of comb drive assembly sets 658 and 659, the second comb drives 663 of the first and second comb drive assemblies 656 and 657 share a second bar 681 such that the two second comb drives 663 are back-to-back. Movable comb fingers 682 of each second comb drive 663 are offset relative to the respective stationary comb fingers 677 so that the movable comb fingers 682 can interdigitate with the stationary comb fingers 677 when the second comb drive 663 is pivoted about the virtual pivot point or pivot point of microactuator 653 towards the respective first comb drive 662.

Figures 3, 7:
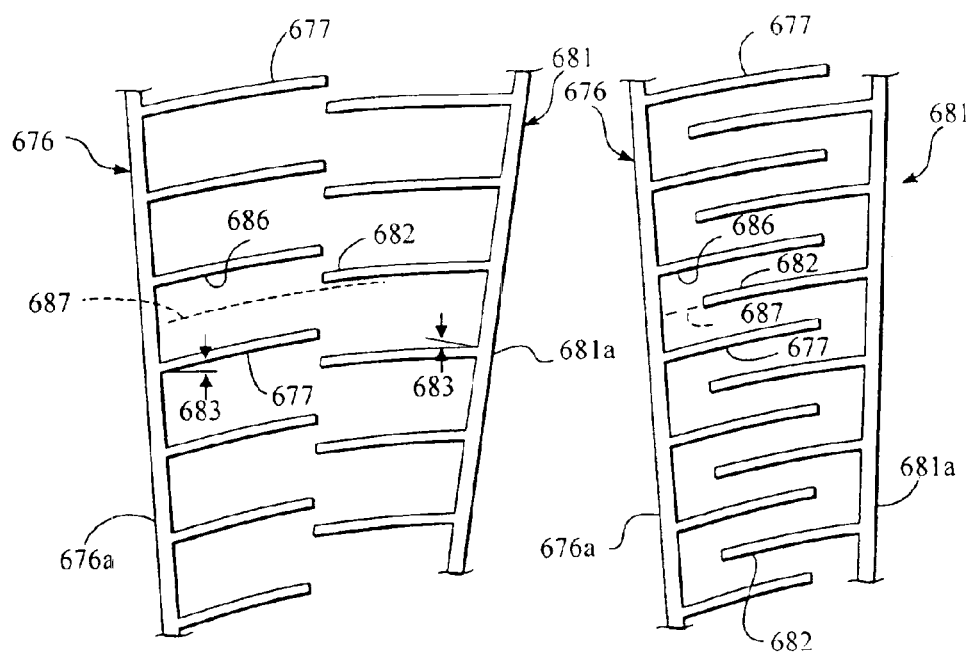
FIG. 3 is a fragmentary plan view of a portion of the first microactuator of the balanced microdevice of FIG. 2 taken along the line 3—3 of FIG. 2 and rotated 90°.
FIG. 7 is a fragmentary plan view, similar to FIG. 3, of a portion of the first microactuator of FIG. 6 taken along the line 7—7 of FIG. 6 and rotated 90°.
Figure 4:
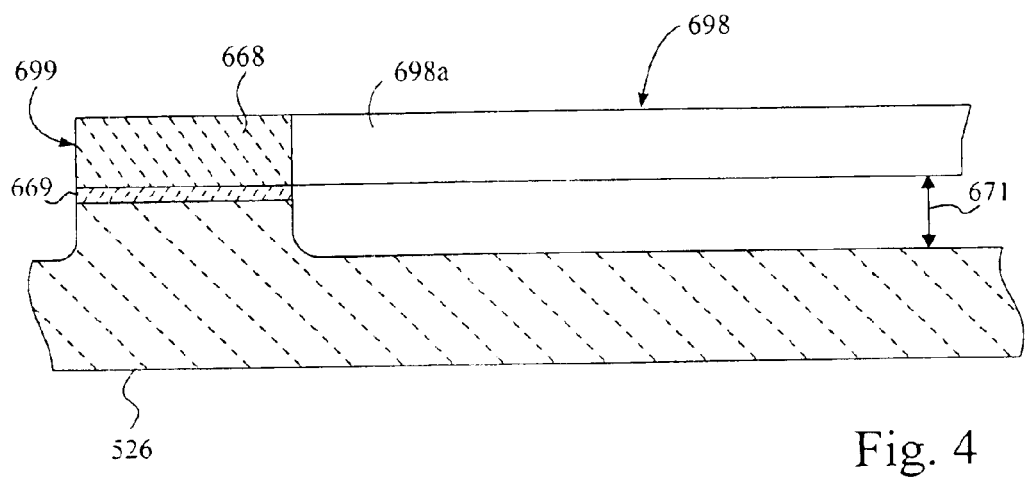
FIG. 4 is a cross-sectional view of the first microactuator of FIG. 2 taken along the line 4—4 of FIG. 2.

Each of first and second comb fingers 677 and 682 are optionally inclined relative to respective bars 676 and 681, that is each comb finger is joined to the respective bar at an oblique angle as opposed to a right angle (see FIG. 3). The inclination angle 683 at which each comb finger 677 and 682 is joined to its respective bar 676 or 681, measured from a line extending normal to the bar, can range from zero to five degrees and is preferably approximately three degrees. Stationary comb fingers 677 are inclined at such inclination angle 683 towards outer radial portion 376*b* of the stationary bar 676. Conversely, movable comb finger 682 are inclined at inclination angle 683 towards inner radial portion 681 of the movable bar 681. The inclination angle 683 of first comb fingers 677 is preferably equal to the inclination angle of second comb fingers 682. In one preferred embodiment, the equation defining the shape of each first and second comb finger 677 and 682 is:

$$R_2(\theta) = R_0 + m\theta + b,$$

where $R_0$ is the nominal radius of the comb finger measured from the virtual pivot point of microactuator 653, m is the slope and b is the offset of the comb finger from the nominal radius.

Each second comb drive finger 682 is optionally offset relative to the midpoint between the adjacent pair of first comb drive fingers 677 between which the second comb drive finger interdigitates when second comb drive 663 is electrostatically attracted to first comb drive 662. Each adjacent pair of first comb drive fingers 677 has a space 686 therebetween, as shown most clearly in FIGS. 3 and 7. The midpoint between an adjacent pair of first comb drive fingers 677 is represented by an imaginary midpoint line 687 in the figures. The initial offset of each first comb drive finger 677 from the respective midpoint line 687, measured when second comb drive 663 is in its rest position shown in FIGS. 2 and 17, can range from zero to two microns and is preferably approximately 0.75 microns in the illustrated embodiment. The offset of comb drive fingers 677 from midpoint line 687 has been exaggerated in FIG. 3 to facilitate the visualization and understanding thereof. It should be appreciated that comb fingers 677 and 682 which extend from their respective comb drive bars in arcs having a constant radius measured from the pivot point of microactuator 653 can be provided.

Although first and second comb fingers 677 and 682 can be identical in shape and size, the comb drive fingers of first microactuator 653 vary in size and shape. More specifically, second comb fingers 682 in first comb assembly 656 of the first set 658 of comb drive assemblies decrease in length in a linear manner from the inner radial extremity of second or movable comb drive 663 to the outer radial extremity thereof. Similarly, second comb fingers 682 in second comb drive assembly 657 of the second set 659 of comb drive assemblies decrease linearly in length from the inner radial portion 681*a* of second or movable comb bar 681 to the outer radial portion 681*b* of the second bar.

Figure 5:
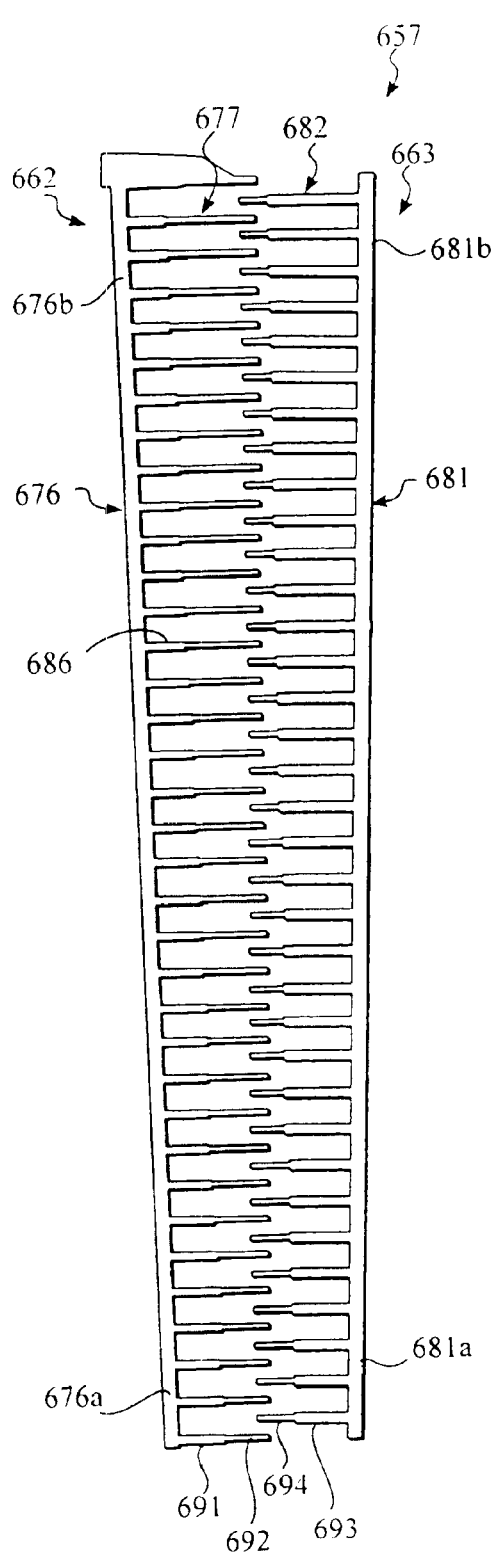
FIG. 5 is a fragmentary plan view of the first microactuator of FIG. 2 taken along the line 5—5 of FIG. 2 and rotated 90°.
Figure 8:
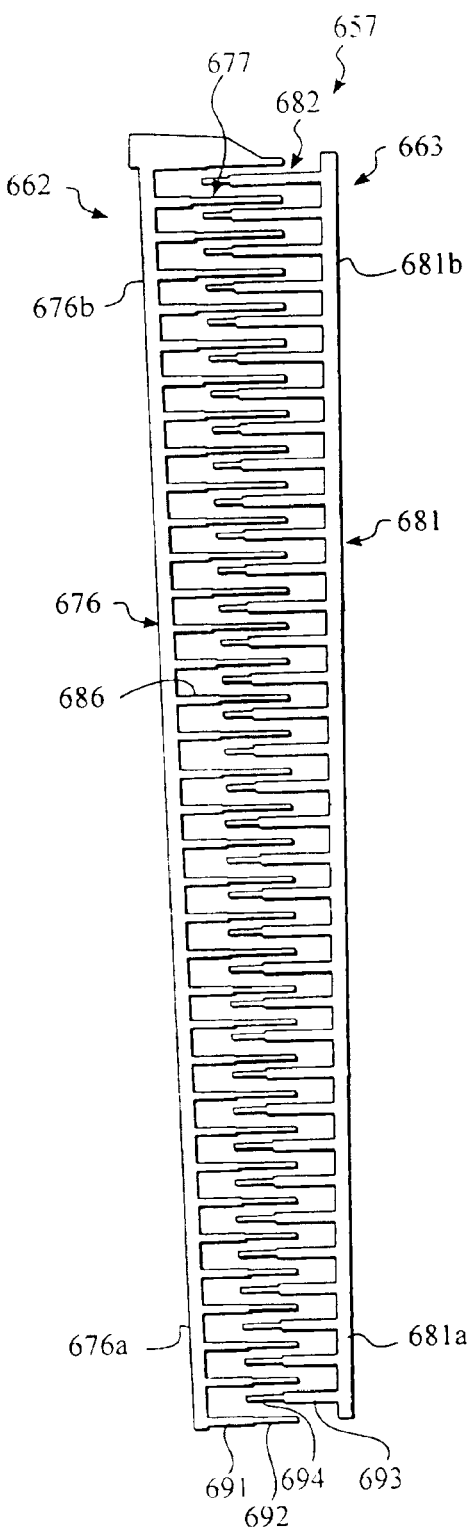
FIG. 8 is a fragmentary plan view, similar to FIG. 5, of the first microactuator of FIG. 2 in a position between the position of FIG. 2 and the position of FIG. 6.

First and second comb fingers 677 and 682 can be of constant width, as they extend outwardly from the respective bars 676 or 681, as with the comb fingers 677 and 682 in first comb drive assembly 656 of first set 658 and the comb fingers in second comb drive assembly 657 of second set 659, or can vary in width along the length thereof. For example, each of the comb fingers 677 and 682 in second comb drive assembly 657 of the first set 658 and in first comb drive assembly 656 of the second set 659 has an inner of proximal portion that is wider than the outer or distal portion of such comb finger. Specifically, each first comb finger 677 in such comb drive assemblies has an inner or proximal portion 691 and an outer or distal portion 692, as shown in FIGS. 5 and 8. Similarly, each second comb finger 682 in such comb drive assemblies has an inner or proximal portion 693 and an outer or distal portion 694. Each inner portion 691 or 693 has a width ranging from 4 to 20 microns and preferably approximately 10 microns, and each outer portion 692 and 694 has a smaller width ranging from 2 to 12 microns and preferably approximately five microns. Each of the stationary inner portions 691 has a length ranging from 40 to 150 microns and preferably approximately 80 microns and preferably, as shown in FIG. 5, and decreases linearly in relative length, that is after taking into consideration the increase in length with radius of each comb drive finger to reflect the truncated sector-shaped or pie-shaped configuration of the comb drive assemblies, from inner radial portion 676*a* of the first bar 676 to outer radial portions 676*b* of the first bar. Each of the movable inner portions 693 has a length of ranging from 40 to 150 microns and preferably approximately 80 microns and increases linearly in relative length from inner radial portion 681*a* to outer radial portions 681*b* of the second bar 681.

The outer radial portions 681*b* of the second bars 681 are joined to a connector bar or shuttle 696 extending substantially perpendicularly to the bars 681 and arcuately relatively to the virtual pivot point of microactuator 653. Shuttle 696 is a substantially rigid member and is included in movable structure 667 of the microactuator 653. The shuttle 696 forms the outer radial periphery of microactuator 653 and extends sideways to each of the sides of the microactuator.

Means including at least first and second springs 664 and 666 are provided in rotary electrostatic microactuator 653 for movably supporting second comb drives 663 and the remainder of movable structure 667 over the substrate 526. First and second springs 664 and 666 are symmetrically disposed about radial centerline 672 and, when in their respective rest positions shown in FIG. 2, are each centered on a radial line extending through the virtual pivot point of first microactuator 653. The springs 664 and 666 are angularly spaced apart approximately 20 to 30 degrees about the virtual pivot point of microactuator 653. First and second comb drive assemblies 656 and 657 are disposed between springs 664 and 666, although at least some of the comb drives assemblies can optionally be disposed outside of the springs.

Each of springs 664 and 666 can be of any suitable type and is preferably formed from a single beam-like spring member 698 having a first or inner radial end portion 698*a* and a second or outer radial end portion 698*b* (see FIGS. 2 and 6). It should be appreciated however that first and second springs 664 and 666 can have other configurations when in their rest positions, such as being pre-bent as disclosed in U.S. Pat. No. 5,998,906, and be within the scope of the present invention. The inner radial end portion 698*a* is coupled or secured to substrate 526 at an anchor 699 so as to suspend the spring member 698 above the substrate a distance equal to air gap 671. The outer radial end portion 698b of each spring member 698 is secured to shuttle 696 and thus coupled to the second comb drive 663 of first microactuator 653. Each of the spring members 698 has a length ranging from 300 to 3000 microns and preferably approximately 1000 microns and has a width ranging from 1 to 20 microns and preferably approximately four microns. First and second elongate sacrificial bars 701 of the type described in U.S. Pat. No. 5,998,906 extend along each side of each spring member 698 for ensuring even etching of the desired rectangular cross section of the spring member 698. Each of springs 664 and 666 has a thickness similar to the thickness of movable structure 667, and preferably the same as movable structure 667. In the embodiment illustrated in FIGS. 2–8, the springs 664 and 666 form the respective first and second radial sides of first microactuator 653.

Each of second comb drives 663 is movable in opposite first and second angular directions about the virtual pivot point of microactuator 653 in the same manner as discussed above with respect to microactuator 507. In general, each second comb drive 663 is movable in the first angular direction about the pivot point between a first or intermediate position in which comb fingers 677 and 682 of respective comb drive assembly are not substantially fully interdigitated and a second position in which such comb fingers are substantially fully interdigitated. Each of first and second comb drive assemblies 656 and 657 is shown in FIG. 2 in their first positions and second comb drive assemblies 657 are shown in FIG. 6 in their second positions. Each of the second comb drives 663 is also movable in the second angular direction about the pivot point of microactuator 653 between its intermediate position and a third position which comb fingers 677 and 682 are spaced apart and fully disengaged. First comb drive assemblies 656 are shown in FIG. 6 in their spaced apart and fully disengaged third positions.

Means is included within first microactuator 653 for limiting the angular movement of movable structure 667 between its extreme angular positions about the virtual pivot point of the microactuator. In this regard, a bumper 706 is formed on shuttle 696 for alternatively engaging first and second stops 707 formed on substrate 526 from top wafer 668.

Electrical means is included in controller 561 or related control electronics for driving second comb drives 663 between their first and second positions. Such electrical means include a suitable controller, such as controller and voltage generator 561 discussed above with respect to microactuator 507, that is electrically connected to the first and second comb drives 662 and 663 of microactuator 653. In this regard, the inner radial end portion 676a of each first comb drive 662 is electrically connected to controller 561 by means of a lead 708 extending to a bond pad 709 provided along one side of substrate 526. Movable structure 667 is electrically connected to controller 561 by a lead 711 extending to a bond pad 712 also provided on a side of substrate 526. Bond pads 709 and 712 are electrically coupled by suitable wires or other leads (not shown) to controller 561. Means in the form of a closed loop servo control system can optionally be included in controller 561 or related control electronics for monitoring the position of movable structure 667 relative to substrate 526. For example, controller 561 can include a conventual algorithm of the type discussed above the respect to microactuator 507 for measuring the capacitance between comb fingers 682 of movable comb drives 663 and comb fingers 677 of stationary comb drives of 662.

The structural components of first microactuator 653, that is movable structure 667, first and second springs 664 and 666 and first comb drives 662, have the shape of a truncated fan when viewed in plan (see FIGS. 2 and 6). In this regard, such components resemble a truncated or foreshortened sector of a circle. Such components do not extend to the virtual pivot point of microactuator 653, but instead are spaced radially outwardly from such virtual pivot point. As such, the virtual point of the microactuator 653 intersects the plane of substrate 526 at a point outside the confines of the components of microactuator 653 and, more specifically, outside the confines of movable structure 667. Springs 664 and 666 and movable structure 667 subtend an angle about the virtual pivot point of microactuator 653 of less than 180 degrees and preferably less than 90 degrees. More preferably, springs 664 and 666 and movable structure 667 subtend an angle of approximately 45 degrees about such virtual pivot point.

Movable structure 667 is rotatable about the virtual pivot point of microactuator 653 in opposite first and second angular directions from its at-rest or intermediate position shown in FIG. 2 in the same manner as discussed above with respect to microactuator 507. In general, when movable structure 667 moves in a clockwise direction about such virtual pivot point, second comb drives 663 in first comb drive assemblies 656 of each set 658 and 659 move to their respective second positions. When movable structure is moved in an opposite counterclockwise direction about such virtual pivot point, second comb drives 663 in second comb drive assemblies 657 of each set 658 and 659 move to their respective second positions, as shown in FIG. 6.

Reflector 506 is coupled to microactuator 653. Specifically, the reflector 506 is carried by movable structure 667 in the same manner as discussed above with respect to microactuator 507 and extends perpendicularly from the plane of microactuator 653. First and second spaced-apart pads 713 and 714 are included on movable structure 667 for receiving the reflector 506. First pad 713 extends from inner radial end portions 681a of the second comb drives 663 of first set 658. Second pad 714 extends from the end of shuttle 696 secured to first spring 664. Pads 713 and 714 are included in the coupling means or coupler of microdevice 652 for connecting the reflector 506 to the microactuator 653.

A counterbalance 726 is carried by substrate 526 and coupled to second comb drives 663 of first microactuator 653. The counterbalance or counterbalancing means 726 optionally includes a second microactuator and preferably a MEMS-based microactuator of any suitable type. The counterbalance more preferably includes a rotary electrostatic microactuator or any other suitable electrostatic microactuator. In one preferred embodiment, shown in FIGS. 2 and 6, a balancing microactuator 727 substantially similar to first microactuator 653 is included in counterbalance 726. Like reference numerals have been used in the drawings to describe like components of microactuators 653 and 727. Stationary comb drive fingers or comb fingers 731 and movable comb drive fingers or comb fingers 732 of microactuator 727, identified in FIG. 6, are substantially similar to the comb fingers 676 and 682 in second comb drive assembly 657 of first set 658 and the comb fingers 676 and 682 in first comb drive assembly 656 of second set 659 of microactuator 653. Each of the stationary comb fingers 731 has an inner portion 691 and an outer portion 692, and each of the movable comb fingers 732 has an inner portion 693 and an outer portion 694.

In the same manner as discussed above with respect to first microactuator 653, movable structure 667 of balancing microactuator 727 moves or rotates in first and second opposite angular directions about a virtual pivot point, identified as pivot point 723 in FIG. 2. Pivot point 723 is generally located at the intersection of straight lines drawn from first and second springs 664 and 666, when in their respective rest positions, and radial centerline 672 of the microactuator 727.

Electrical means is included for driving second comb drives 534 of balancing microactuator 727 between their first and second positions and can include controller and voltage generator 561 used for controlling first microactuator 653. Controller 561 is electrically coupled to balancing microactuator 727 in the same manner as discussed above with respect to first microactuator 653 by means of bond pads 709 and 712 of the balancing microactuator 727. A suitable closed loop servo control system, such as one using a conventional algorithm of the type discussed above, can optionally be included in controller 561 or related control electronics for measuring the capacitance between comb fingers 677 and 682 of balancing microactuator 727 to monitor the position of the movable structure 667 of the balancing microactuator 727.

Counterbalance 726 further includes a link 736 for coupling balancing microactuator 727 to first microactuator 653 and, more specifically, for coupling second comb drives 663 of the balancing microactuator 727 to second comb drives 663 of the first microactuator 653. Link or levers assembly 736 is anchored to substrate 526 by a mount 737 formed from top wafer 668 and secured to the substrate 526 by silicon dioxide layer 669. Link 736 includes a lever arm 738 having first and second end portions 738a and 738b and a central portion 738c (see FIG. 2). Lever arm 738 is pivotally coupled to mount 737 by means of a pivot assembly 741, which is X-shaped in conformation when viewed in plan and is formed from first and second pivot arms 742 joined at their center to form a pivot point 743 for the pivot assembly. The pivot assembly 741 is elongate in shape, with the first ends of the pivot arms 742 joined in spaced-apart positions to mount 737 and the second ends of the pivot arms joined in spaced-apart positions to lever arm 738 at central portion 738c. Each of the pivot arms 742 has a width and thickness similar to the width and thickness of spring members 698. First and second sacrificial bars 744, similar to sacrificial bars 701 discussed above, extend along each side of the pivot arms 742 for ensuring even etching of the desired rectangular cross section of the pivot arms.

First and second ends 738a and 738b of the level arm 738 are joined to the respective shuttles 696 of first microactuator 653 and balancing microactuator 727 by respective first and second coupling members or coupling springs 746 and 747 (see FIGS. 2 and 6). Springs 746 and 747 are similar to first and second springs 664 and 666 and are each formed from a spring member 748 substantially similar to spring member 698. Each of the spring members 748 has one end secured to the respective end of lever arm 738 and the other end secured to a bracket 751 joined to the respective shuttle 696. First and second sacrificial bars 752, substantially similar to sacrificial bars 701 discussed above, extend along each side of each spring member 748 for the reasons discussed above. Lever arm 738, pivot assembly 741, first and second coupling springs 746 and 747 and brackets 751 are each formed from top wafer 668 and overlie substrate 526 by the distance of air gap 671.

Counterbalance 726 optionally further includes one or more weights 756 carried by movable structure 667 of balancing microactuator 727 to offset or counterbalance the weight of reflector 506 mounted on the movable structure 667 of first actuator 653. In one preferred embodiment, a platform 757 is formed between the back-to-back movable bars 681 in each of the first set 658 of comb drive assemblies and the second set of 659 of comb drive assemblies of balancing microactuator 727. Each of the platforms 757 is formed from top wafer 668. Weights 756 are secured to platform 575 by any suitable means such as an adhesive (not shown). Movable structures 667 of first microactuator 653 and balancing microactuator 727, reflector 506, weights 756 and link 736 are included in the movable framework 758 of balanced microdevice 652.

In operation and use of microdevice 652, each of first microactuator 653 and balancing microactuator 727 are preferably driven by controller 561 in the same manner as discussed above with respect to microactuator 507. Movement of movable structure 667 of microactuator 653 and reflector 506 is obtained by providing suitable voltage potentials from controller 561 to first and second comb drive assemblies 656 and 657 of the microactuators 653 and 727.

The offset and inclined comb drive fingers of second comb drive assemblies 656 and 657 contribute to the stability of first microactuator 653. In this regard, the bending of first and second springs 664 and 666 during interdigitation of comb fingers 677 and 682 causes the springs 664 and 666 to shorten slightly and thus results in movable comb fingers 682 following a noncircular trajectory. The actual trajectory of comb fingers 682 during movement from their first to second positions is approximated by the equation $$R_1(\theta)=(R_p-A\theta^2)sec(\theta),$$

where A is given by $$A=(18R_p^2+2L^2-3LR_p)/30L,$$

with L being the length of spring members 698 and $R_p$ being the distance from the virtual pivot of first microactuator 653 to outer radial end portions 698b of the spring members 698.

The complimentary inclination of first and second comb drive fingers 677 and 682 relative to respective comb drive bars 676 and 681 results in the comb fingers having a shape that compensates for the trajectory of the second comb drives 663. As discussed above, first comb drive fingers 677 are inclined radially outwardly of the respective comb drive bar 676 and second comb drive fingers 862 are inclined radially inwardly at a equal angle relative to the respective comb drive bar 681. Such cooperative inclination of the comb fingers contributes to each second comb drive finger 682 being more centered relative to the respective par of adjacent first comb drive fingers 677 during interdigitation of the first and second comb drive fingers 677 and 682. Since the comb drive fingers remain more centered, radial stability is enhanced during interdigitation.

The offset alignment of second comb drive fingers 682 relative to first comb drive fingers 677 ensures that the second comb drive fingers 682 will be substantially centered on midpoint line 687, as shown in FIG. 7, when the first and second comb drive fingers are fully interdigitated. When this is so, the derivative of the net side force between the comb fingers 677 and 682 is substantially minimized and the side stability is increased. The combination of inclined comb fingers and initial offset allows the radial stability of the comb fingers to be maximized throughout the full deflection range. It should be appreciated the invention is broad enough to cover microactuators having comb drive assemblies with comb fingers that are offset but not inclined or inclined but not offset.

The electrostatic forces exerted between the comb fingers of microactuator 653 remain relatively constant during rotation of movable structure 667. In this regard, the varying of the lengths of comb fingers 682 along comb drive bars 681 in the first and second comb drive assemblies 662 and 663 adjacent radial centerline 672 and the varying of the lengths of inner portions 691 and 693 along the respective comb drive bars 676 and 681 in the first and second comb drive assemblies farthest from centerline 672 minimizes undesirable spikes or peaks in the electrostatic forces exerted between the respective first and second comb drives 662 and 663 during interdigitation of the respective comb fingers 677 and 682.

In an exemplary illustration, FIG. 8 shows second comb drive 663 of second comb drive assembly 657 of first set 658 in a partially interdigitated position between its first position shown in FIG. 5 and its second position shown in FIG. 6. As can be seen therein, outer portion 692 of the stationary comb fingers 677 at outer radial portion 676b of first bar 676 is approximately half interdigitated between the inner portions 693 of adjacent movable comb fingers 682 at outer radial portion 681b of the second bar 681. The amount of interdigitation between the outer portion 692 of stationary comb fingers 677 with the inner portion 693 of movable comb fingers 682 decreases in a substantially linear manner from the outer radial portion to the inner radial portion of such first and second comb drive assemblies 6565 and 657. The amount of interdigitation between outer portion 694 of the movable comb fingers 682 and the inner portion 691 of adjacent stationary comb fingers 677 at the inner radial portion of the second comb drive assembly 657 illustrated in FIGS. 5 and 8 is less than the amount of interdigitation between outer portion 692 of the stationary comb fingers 677 and the inner portion 693 of adjacent movable comb fingers 682 at the inner radial portion of such second comb drive assembly 657. The amount of interdigitation between outer portion 694 and adjacent inner portions 691 decreases from the inner radial portion to the outer radial portion of such second comb drive assemblies 657.

Thus, as can be seen from FIG. 8, outer portions 692 sequentially commence interdigitation between adjacent inner portions 693, commencing at the outer radial portion of such second comb drive assembly 657 and continuing towards the inner radial portion of such second comb assembly 657, during movement of the respective second comb drive 663 towards the respective first comb drive 662 and thereafter outer portions 694 sequentially commence interdigitation between adjacent inner portions 691, commencing at the inner radial portion and continuing to the outer radial portion of such second comb drive assembly 657, during further rotational movement of such second comb drive 663 about the virtual pivot point of first microactuator 653 towards the first comb drive 662 of such second comb drive assembly 657. In this manner, any spike or peak in the engagement force resulting from an outer portion 692 or 694 interdigitating between the relatively wider inner portions 691 or 693 is spread throughout the interdigitation of a complimentary pair of first and second comb drives 662 and 663.

Counterbalance 726 serves to inhibit undesirable movements of the second comb drives 663 in first microactuator 653, and thus microreflector 506 carried thereby, in the direction of travel of those components from externally applied accelerations to microdevice 652. As discussed above, first and second suspension members or springs 664 and 666 provide radial stiffness to first microactuator 653. As such, springs 664 and 666 inhibit undesirable movements of the second comb drives 663 in the radial direction when forces or accelerations are externally applied to microdevice 652. The counterbalance 726 particularly minimizes undesirable movements in an angular direction about the pivot point of first microactuator 653.

Angular movements of movable structure 667 of first microactuator 653 about the virtual pivot point of the microactuator 653 are counterbalanced by opposite angular movements of the movable structure 667 of balancing microactuator 727 about the virtual pivot point 733, shown in FIG. 2, of the microactuator 727. Specifically, when second comb drive assemblies 657 of first microactuator 653 are driven by controller 561 from their first position to their second position, as shown in FIG. 6, second comb drive assemblies 657 of balancing microactuator 727 are moved from their first position to their third position. Similarly, a clockwise movement of movable structure 667 of first microactuator 653 is offset by a counterclockwise movement of movable structure 667 of balancing microactuator 727.

The mass of reflector 506 mounted on movable structure 667 may be balanced by optional weights 756 mounted on movable structure 667 of balancing microactuator 727. The mass of optional weights 756 is adjusted so that the line between the virtual pivot of the first microactuator 653 and the combined center of mass of movable structure 667 of first microactuator 653 and reflector 506 is parallel to the line between the virtual pivot 733 of balancing microactuator 727 and the combined center of mass of movable structure 667 of balancing microactuator 727 and optional weights 756. The mass of optional weights 756 is also adjusted so that the product of the combined mass of movable structure 667 of first microactuator 653 and reflector 506 with the distance between the virtual pivot of first microactuator 653 and the combined center of mass of movable structure 667 of first microactuator 653 and reflector 506 is equal to the product of the combined mass of movable structure 667 of balancing microactuator 727 and optional balancing weights 756 with the distance between the virtual pivot 733 of balancing microactuator 727 and the combined center of mass of movable structure 667 of balancing microactuator 727 and optional weights 756. Linear accelerations to device 652 then produce equal torques on both first microactuator 653 and balancing microactuator 727 and equal forces on the two ends 738a and 738b of link 738 on pivot assembly 741.

If the perpendicular distances between the pivot point 743 and the coupling springs 748 are not equal, but instead have a ratio R, then the mass of optional weights 756 can be adjusted so that linear accelerations to device 652 produce torques on first microactuator 653 and balancing microactuator 727 that are not equal, but have the same ratio R. The force produced by linear accelerations acting on the mass of lever arm 738 may also be included when balancing the forces on the two ends 738a and 738b of pivot assembly 741.

Figure 9:
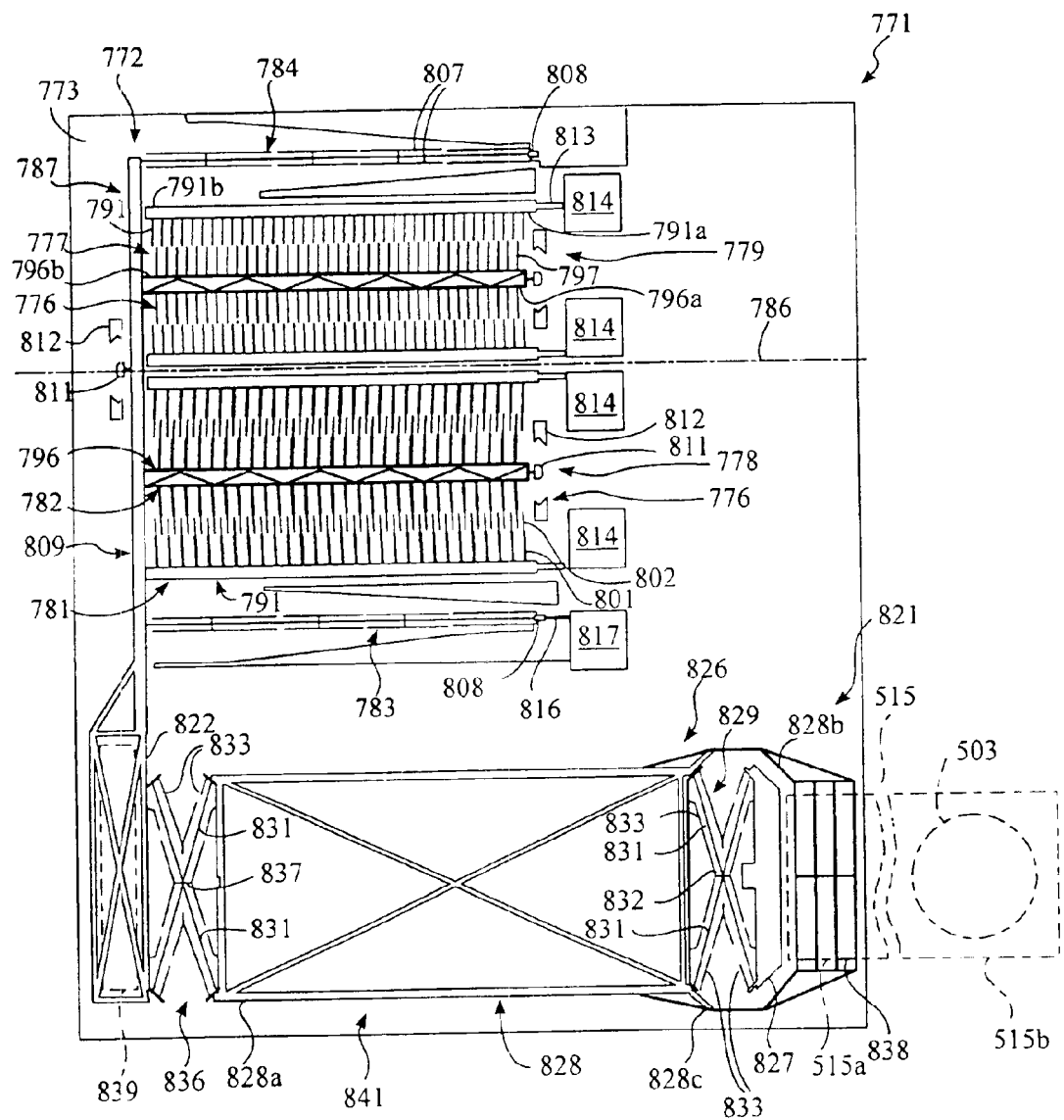
FIG. 9 is a plan view of another embodiment of the balanced microdevice of the present invention.
Figure 10:
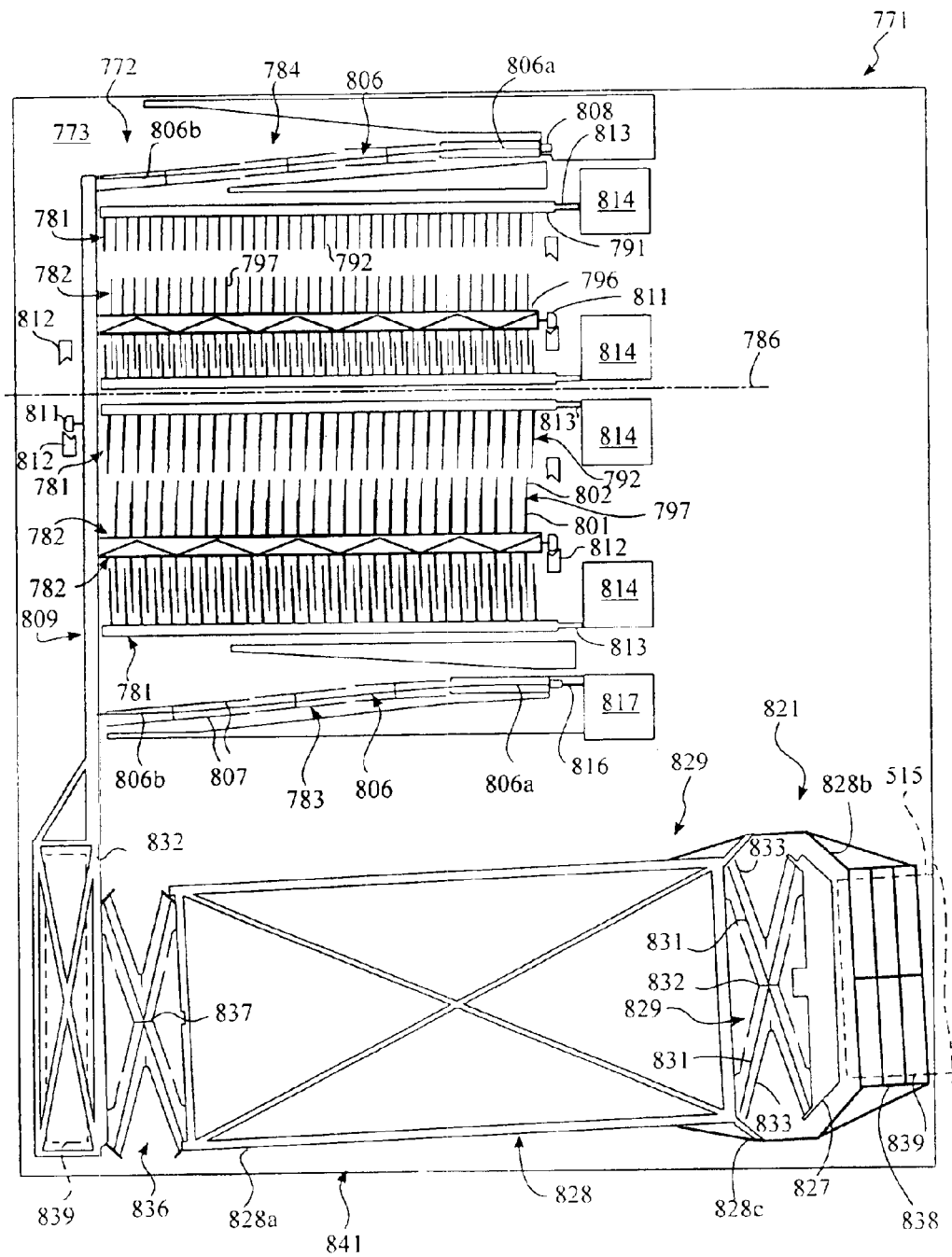
FIG. 10 is a plan view of the balanced microdevice of FIG. 9 in a second position.

Other embodiments of the balanced microdevice of the present invention can be provided. Another balanced apparatus or microdevice 771 is shown in FIGS. 9 and 10 for moving any suitable object or element. In one preferred embodiment, such an object is an optical element such as a collimating lens 503 carried by a lens substrate or block 515 having first and second end portions 515a and 515b. In general, microdevice 771 serves to move collimating lens 503 and is balanced to inhibit undesirable movement of the collimating lens 503 and lens block 515 from externally applied accelerations to the device. In one preferred embodiment, balanced microdevice 771 includes a microactuator or motor 772 which is preferably a MEMS-based microactuator of any suitable type and more preferably an electrostatic microactuator similar to microactuator 508 described above.

Linear microactuator 772 can be constructed in the manner discussed above with respect to first microactuator 653 atop a planar substrate 773 that is substantially similar to substrate 526 discussed above. At least one and preferably a plurality of first and second comb drive assemblies 776 and 777, which are preferably linear comb drive assemblies, are carried by substrate 773 and arranged on substrate 773 in first and second sets 778 and 779. Each of the first and second comb drive assemblies 776 and 777 includes a first comb drive member or comb drive 781 mounted on substrate 773 and a second comb drive member or comb drive 782 overlying the substrate 773. At least first and second spaced-apart suspension members or spring members 783 and 784 are included in microactuator 772 for supporting or suspending the second comb drives 782 over the substrate 773 and for providing stiffness to the second comb drives 794 in a direction along a longitudinal centerline 786 of the microactuator 782.

The components of microactuator 772 are formed atop substrate 773 by a top layer or wafer substantially similar to top wafer 668 of first microactuator 653. The top wafer is secured to substrate 773 in any suitable manner and is preferably fusion bonded to the substrate by means of a silicon dioxide layer (not shown). The components of microactuator 772 can be formed by any suitable means and are preferably etched from the top layer by any of techniques discussed above with respect to microactuator 508. Second comb drives 782 are part of a movable portion or structure 787 that, together with springs 783 and 784, is spaced above substrate 773 by an air gap, similar to air gap 671 discussed above with respect to first microactuator 653, so as to be electrically isolated from substrate 773.

First and second comb drive assemblies sets 778 and 779 optionally extend parallel to each other in symmetrical disposition relative to longitudinal centerline 786 of microactuator 772. A single first comb drive assembly 776 and a single second comb drive assembly 777 are provided in each set 778 and 779 of comb drive assemblies. First comb drive 871 of each of first and second comb drive assemblies 776 and 777 is immovably secured to substrate 773 and has a longitudinally-extending truss or bar 791 having first and second portions 791a and 791b. A plurality of comb drive fingers or comb fingers 792 extend from one side of bar 791 in longitudinally spaced-apart positions along the length of the bar.

Second comb drives 782 are spaced above substrate 773 so as to be movable relative to the substrate and first comb drives 781. The second comb drives 782 have a construction similar to first comb drives 781 and, more specifically, are each formed with a longitudinally—extending truss or bar 796 having first and second end portions 796a and 796b. The second comb drives 782 of each set 778 and 779 are disposed back-to-back and, as such, share a bar 796. A plurality of comb drive fingers or comb fingers 797 extend from each side of each bar 796 to form the back-to-back second comb drives 782 of each set 778 and 779. The comb fingers 797 on each side of bar 796 are longitudinally spaced apart along the length the bar 796.

Comb fingers 792 and 797 are substantially similar in construction. Each of the comb fingers are preferably of the type disclosed in International Publication No. WO 00/62410 having an International Filing Date of Apr. 12, 2000 and as such are inclined and offset. As more fully disclosed International Publication No. WO 00/62410, each of the comb fingers is slightly inclined from a line extending normal to the respective bar 791 or 796. In addition, when each of the comb drive assemblies 776 and 777 is in its rest position, movable comb fingers 797 are offset relative to a midpoint line extending between the adjacent pair of stationary comb fingers 792 into which such comb fingers 797 interdigitate. In addition to the foregoing, the comb fingers 792 and 797 in first set 778 of comb drive assemblies are similar in construction to certain of the comb fingers discussed above with respect to first microactuator 653. More specifically, the comb fingers in first set 778 are each formed with a first or inner portion 801 and a second or outer portion 802. The inner portion 801 of each such comb finger has a width greater than the width of the respective outer portion 802. The comb fingers 792 and 797 in second set 779 of comb drive assemblies each have a constant width along the length thereof.

First and second springs 783 and 784 are substantially similar in construction to springs 664 and 666 discussed above and each include a single spring member 806 and first and second sacrificial bars 807 extending parallel to the spring member along each of the opposite sides of the spring member. Each spring member 806 has a first end portion 806a and an opposite second end portion 806b. First end portion 806a of each spring members is coupled or secured to substrate 783 at an anchor 808 and second end portion 806b of each spring member is coupled or secured to second comb drives 782. In this regard, an elongate bar or shuttle 809 is secured to the free second end portion 806b of each spring member 806. Shuttle 809 extends substantially perpendicular to springs 783 and 784 when the springs are in their rest positions shown in FIG. 9. The second end portion 796b of each movable bar 796 of the second comb drives 782 is perpendicularly joined to the portion of shuttle 809 extending between springs 783 and 784. The shuttle 809 is part of the movable structure 787 of microactuator 772. It should be appreciated that some of the first and second comb drive assemblies 776 and 777 of microactuator can be disposed outside of springs 783 and 784.

Second comb drives 782 of each of first and second comb drive assemblies 776 and 777 are movable in a first direction from their first or intermediate positions shown in FIG. 9, in which comb fingers 792 and 797 are not substantially fully interdigitated, to a second position, in which the comb fingers 792 and 797 are substantially fully interdigitated. The second comb drives 782 are also movable from their first position in an opposite second direction to a third position, in which the comb fingers 792 and 797 are spaced apart and fully disengaged. The comb fingers of first comb drive assemblies 796 are shown in FIG. 10 in the second position, in which the comb fingers are substantially fully interdigitated, while the comb fingers of second comb drives assemblies 777 are shown in FIG. 10 in the third position, in which the comb fingers are spaced apart and fully disengaged. First and second springs 783 and 784 permit the movement of second comb drives 782 and provide longitudinal rigidity to shuttle 809 and a second comb drives so as to inhibit snap over between interdigitated comb fingers 792 and 797.

The interdigitation of the comb drive fingers of first comb drive assembly 776 serves to move shuttle 809 and the remainder of movable structure 787 in a sideways direction substantially perpendicular to longitudinal centerline 786 to a first position relative to substrate 773, as shown in FIG. 10. The interdigitation of the comb drive fingers of second comb drive assemblies 777 serves to move shuttle 809 and the remainder of movable structure 787 in an opposition second direction to a second position relative the substrate 773 (not shown). Bumpers 811 are provided on the first end portions 796a of movable comb drive bars 796 and on shuttle 809 for engaging respective stops 812 formed on substrate 773 to limit the sideways movement of the second comb drives 782 and shuttle 809 and thus define the first and second positions of the shuttle 809 and the remainder of movable structure 787.

Electrical means is included for driving second comb drives 782 and the remainder of movable structure 787 between their first and second positions. Such electrical means includes a controller, such as controller 561. An electrical lead or trace 813 extends from first end portion 791a of each first comb drive 781 to a bond pad 814 for permitting electrical control signals to be supplied to the first comb drives 781. An additional electrical lead or trace 816 extends from the first end portion 806a of the spring member 806 of first spring 783 to a bond pad 817 for permitting electrical control signals to be supplied to the movable second comb drives 782. Bond pads 814 and 817 are electrically coupled by suitable wires or leads (not shown) to the controller 561. Means in the form of a closed loop servo control system, such as the conventional algorithm discussed above, can optionally be included in controller 561 or related control electronics for measuring the capacitance between comb fingers 792 and 797 to monitor the position of the second comb drives 782 of microactuator 772.

A counterbalance 821 is carried by substrate 773 and coupled to second comb drive 782 of microactuator 772. In this regard, elongate shuttle 809 extends forwardly of microactuator 772 and is formed with a platform 822. Counterbalance or counterbalancing means 821 includes a lever assembly or coupler 826 that is carried by substrate 773 and serves to couple collimating lens 503 and lens block 515, or any other suitable movable member or optical element, to shuttle 809.

Lever assembly 826 is formed from the top wafer disposed atop substrate 773 and includes an anchor or mount 827 rigidly secured to the substrate 773. A lever arm 828 is provided and has opposite first and second ends portions 828a and 828b and a central portion 828c. Central portion 828c of the lever arm is secured to mount 827 by a pivot assembly 829 that is substantially similar to pivot assembly 741 described above. In this regard, pivot assembly 829 has first and second pivot arms 831 joined at their center to form a pivot point 832. First and second sacrificial bars 833 extends along each side of the pivot arms. One end of each of the pivot arms is joined to mount 827 and the other end of each of the pivot arms is joined to central portion 828c of lever arm 828.

First end portion 828a of the lever arm is coupled to shuttle platform 822 by means of an additional pivot assembly 836 substantially identical to pivot assembly 829. The pivot arms 831 of pivot assembly 836 form a pivot point 837 where they intersect at the center of the X-shaped pivot assembly 836. A mounting platform 838 is formed at second end portion 828b of lever arm. First end portion 515a of lens block 515 is secured to platform 838 by any suitable means such as an adhesive. The lens block 515 is preferably aligned relative to lever assembly 826 such that the substrate 515 extends along the centerline of lever arm 828. Lever arm 828 and pivot assemblies 829 and 836 of lever assembly 826 are spaced above substrate 773 by an air gap so as to be movable relative to the substrate. An optional weight 839 can be secured to shuttle platform 828 by any suitable means such as a adhesive (not shown). Movable structure 787, collimating lens 503, lens block 515, lever assembly 826 and weight 839 are included in the movable framework 841 of balanced microdevice 771.

In operation and use, first and second comb drive assemblies 776 and 777 of microactuator 772 are preferably driven by the controller 561 in the same manner as discussed above with respect to microactuator 508 to move collimating lens 503 or any other suitable object. As shown in FIGS. 9 and 10, movement of first comb drive assemblies 776 of the microactuator 772 to their second positions causes lever arm 828 to pivot in a counterclockwise direction and thus move collimating lens 503 upwardly relative to substrate 773. Conversely, movement of second comb drive assemblies 777 from their first position to their second position results in lever arm 828 moving in a clockwise direction and thus collimating lens moving downwardly relative to substrate 773. Pivot assembly 826 permits the lever arm 828 to pivot about pivot point 832 and pivot relative to mount 827. Pivot assembly 836 pivotably couples lever arm 828 to shuttle 809 for accommodating such pivotal movement of the lever arm 828 about pivot point 832. Since the amount of angular rotation of collimating lens 503 is substantially small, its upward and downward movement is substantially. It can thus be seen that movement of the second comb drives 782 of microactuator 772 in a first direction causes collimating lens 503 to move in a second direction substantially opposite to the first direction.

In a manner similar to counterbalance 726, counterbalance 821 of second balance microdevice serves to inhibit undesirable movements of the second comb drives 782 of microactuator 772, and thus collimating lens 503, in the direction of travel of those components from externally applied accelerations to microdevice 771. As discussed above, first and second springs 783 and 784 of microactuator 772 provide stiffness to second comb drives 782 along the longitudinal centerline 786 of microdevice 771. Counterbalance 821 particularly inhibits undesirable movements of the second comb drives 782, in a direction substantially perpendicular to centerline 786, between the first, second and third positions of the comb drives. In this regard, the object or element being moved by microactuator 772, in this instance collimating lens 503 and lens block 515, serves as part of the counterbalance of microdevice 771. Factors contributing to the counterbalancing of the microdevice of 771 include the aggregate mass of movable structure 787 and weight 839 relative to the aggregate mass of lens block 515 and collimating lens 503, the location of the center of mass of movable structure 787 and weight 839 relative to the center mass of lens block 515 and collimating lens 503 and the length of first end portion 828a of lever arm 828 relative to the length of second end portion 828b of the lever arm 828. The mass of framework 841 and the distance from pivot 832 to the framework center of mass may also be considered.

Figure 11:
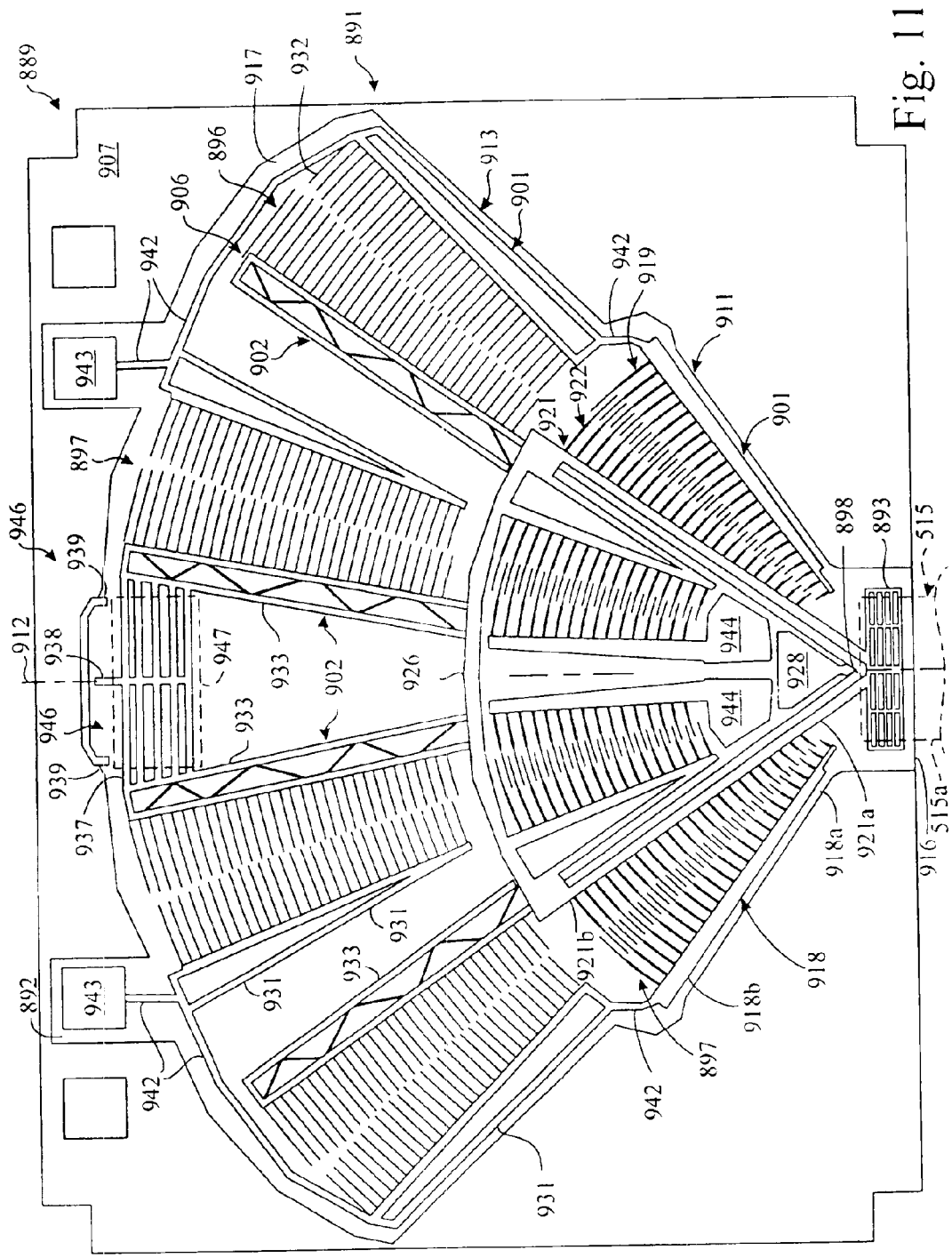
FIG. 11 is a plan view of a further embodiment of the balanced microdevice of the present invention.
Figure 12:
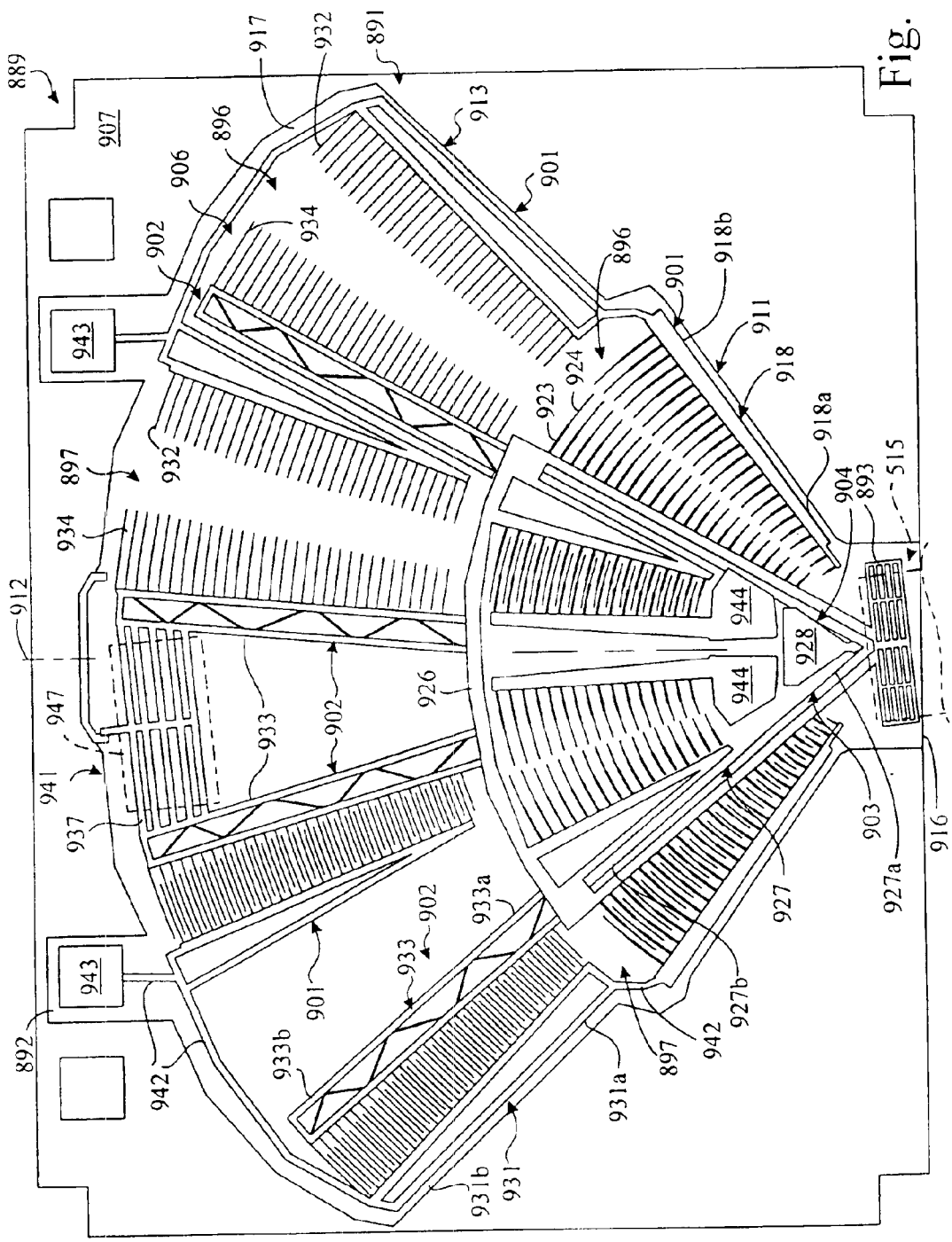
FIG. 12 is a plan view of the balanced microdevice of FIG. 11 in a second position.

Another embodiment of the balanced microdevice of the present invention is shown in FIGS. 11 and 12. Microdevice 889 therein can be used for moving or rotating any suitable object or element such as collimating lens 503. Balanced microdevice 889 has a rotary electrostatic microactuator and preferably a fan-shaped rotary electrostatic microactuator. A balanced microdevice 889 having a particularly preferred rotary electrostatic microactuator 891 is shown in FIGS. 11 and 12. Balanced rotary microactuator 891 is formed from a substrate 892 substantially similar to substrate 526. A movable or rotatable member, in the exemplary embodiment shown as a platform 893, overlies substrate 892. A plurality of first and second comb drive assemblies 896 and 897 are carried by substrate 892 for rotating platform 893 in opposite first and second angular directions about an axis of rotation extending perpendicular to substrate 892 and shown as a pivot point 898 in FIGS. 11 and 12. Each of the first and second comb drive assembles 896 and 897 includes a first comb drive member or comb drive 901 mounted on substrate 892 and a second comb drive member or comb drive 902 overlying the substrate 892. First and second spaced-apart springs 903 and 904 are included in microactuator 891 for supporting or suspending second comb drives 902 and platform 893 over the substrate 892 and for providing radial stiffness to such comb drives and platform. Second comb drives 902 and platform 893 are part of a movable portion or structure 906 of microactuator 892.

Substrate 892 is substantially similar to substrate 526. Platform 893, first and second comb drive assemblies 896 and 897, first and second springs 903 and 904 and the other components of microactuator 891 are formed atop substrate 892 by a second or top layer or wafer 907 substantially similar to top wafer 668 discussed above. The top layer or wafer 907 is preferably fusion bonded to substrate 892 by means of a silicon dioxide layer (not shown). The components of microactuator 891 are formed from top wafer 907 by any suitable means and preferably by any of the techniques discussed above.

At least one and preferably a plurality of first comb drive assemblies 896 are included in balanced rotary microactuator 891 and angularly disposed about pivot point 898 for driving movable structure 906 in a clockwise direction about the pivot point 898.

At least one and preferably a plurality of second comb drive assemblies 897 are included in microactuator 891 for driving movable structure 906 in a counterclockwise direction about pivot point 898. The comb drive assemblies of microactuator 891 are arranged in a first or inner radial set 911 symmetrically disposed about radial centerline 912 of microactuator 891 and in a second or outer radial set 913 symmetrically disposed about radial centerline 912. Each of the comb drive assemblies 896 and 897 extends substantially radially from pivot point 898 and, in the aggregate, subtends an angle of approximately 180 degrees or less, preferably approximately 120 degrees or less and more preferably approximately 90 degrees. As such, microactuator 891 has a fan like shape when viewed in plan, as shown in FIGS. 11 and 12. The microactuator 891 has a base 916 extending substantially perpendicularly of radial centerline 912, and pivot point 898 is disposed adjacent based 916. The microactuator 891 has an arcuate outer radial extremity 917 resembling the arc of a circle centered on pivot point 898 and a radial dimension from pivot point 898 to outer radial extremity 917 ranging from 1000 to 2500 microns and preferably approximately 1600 microns.

Two first comb drive assemblies 869 and two second comb drive assembles 897 are included in inner set 911 of comb drive assemblies. The first comb drive 901 in each comb drive assembly of inner set 911 has a radially-extending bar 918 having a first of inner end portion 918*a* and a second or outer end portion 918*b*. A plurality of comb drive fingers or comb fingers 918 extend from one side of the bar 918 in radially spaced-apart positions along the length of the bar. The second comb drive 902 in each comb drive assembly of inner set 911 is formed from a radially-extending bar 921 having a first or inner end portion 921*a* and a second or outer end portion 921*b*. A plurality of comb drive fingers or comb fingers 922 extend from one side of the bar towards the respective first comb drive 901 in radially spaced-apart positions along the length of the bar. Comb fingers 919 and 922 can be of any suitable size and shape and are preferably arcuate in shape. In a preferred embodiment, piecewise linear segments are used to form the comb fingers 919 and 922 for approximating such an arcuate shape.

Although the comb fingers 919 and 922 can have a constant width along the length thereof, each of the comb fingers preferably has a first or inner portion 923 and a second or outer portion 924. The inner portion 923 has a width greater than the width of outer portion 924 for reasons discussed above. As shown in FIG. 11, comb fingers 919 and 922 are partially interdigitated when in their first rest position. Specifically, outer portions 924 of stationary comb fingers 919 are interdigitated with outer portions 924 of movable comb fingers 922.

The inner end portion 921*a* of the movable bar 921 spaced farthest from radial centerline 912 on each side of inner set 911 of first and second comb drive assemblies is joined to platform 893. The outer end portion 921*b* of each of the movable bars 921 in inner set 911 is joined to a rigid shuttle 926 which is substantially arcuate in shape. The arcuate shuttle 926 is part of the movable structure 906 of balanced rotary microactuator 891.

Although springs 903 and 904 can be of any suitable type, each of the springs preferably consists of a single beam-like member 927 having a first or inner end portion 927*a* and a second or outer end portion 927*b*. The inner end portion 927*a* of each of the spring members is coupled to substrate 892 and, more specifically, is secured to a mount 928 that is formed from top wafer 907 and is rigidly joined to substrate 892. The inner end portions 927*a* are each joined to the mount 928 at pivot point 898. Each of the spring members 927 extends between two adjacent movable bars 921 and the outer end portion 927*b* of each spring member is joined to an end of arcuate shuttle 926. First and second springs 903 and 904 are angularly spaced apart a distance of approximately 70 degrees and, when viewed together in plan, are substantially V-shaped.

A plurality of first and second comb drive assemblies 896 and 897 are included in outer set 913 of comb drive assemblies. More specifically, two first comb drive assemblies 896 and two second comb drive assemblies 897 are included in the outer set 913. The first comb drive 901 in each comb drive assembly 896 and 897 of outer set 913 is formed from a radially-extending bar 931 having a first or inner end portion 931*a* and a second or outer end portion 931*b*. A plurality of comb drive fingers or comb fingers 932 extend from one side of the stationary bar 931 in radially spaced-apart positions along the length of the bar. Each of the second comb drives 902 in outer set 913 is formed from a substantially radially-extending bar 933 having a first or inner end portion 933*a* and a second or outer end portion 933*b*. A plurality of comb drive fingers of comb fingers 934 extend from one side of the movable bar 933 towards the respective first comb drive 901 in radially spaced-apart positions along the length of the bar 933.

Although comb fingers 932 and 934 can be of any suitable size and shape, the comb fingers are preferably arcuate in shape and, like comb fingers 919 and 922, are preferably formed from piecewise linear segments for approximating such an arcuate shape. Comb fingers 932 and 934 are not substantially interdigitated when in their first or rest position, shown in FIG. 11. More specifically, the comb fingers 932 and 934 are disengaged in the rest or intermediate position of FIG. 11. Comb fingers 919, 922, 932 and 934 can optionally be inclined and offset in the manner discussed above with respect to the comb fingers of first microactuator 653.

The inner end portion 933*a* of each movable bar 933 is joined to arcuate shuttle 926 and is thus movable in unison with the movable bars 921 of inner set 911 of comb drive assembles. The second comb drives 902 of the first comb drive assembly 896 and the second comb drive assembly 897 symmetrically disposed relative to the radial centerline at the center of outer set 913 face away from each other. The movable bar 933 of such second comb drives 902 are interconnected by means of a platform 937 that is preferably joined to the outer end portions 933b of such movable bars.

Movable structure 906 is rotatable in first and second opposite angular directions above pivot point 898. Movement of the second comb drives 902 of first comb drive assemblies 896 from their first positions, shown in FIG. 11, to their second positions, in which the respective comb fingers thereof are substantially fully interdigitated, results in movable structure 906 rotating in a clockwise direction about pivot point 898. Similarly, movement of the second comb drives 902 of second comb drive assemblies 897 from their first positions, shown in FIG. 11, to their second positions, in which the comb fingers of such second comb drive assemblies are substantially fully interdigitated as shown in FIG. 12, results in movable structure 906 rotating in a counterclockwise position about pivot point 898. When the second comb drives 902 of one of first and second comb drive assemblies 896 and 897 move to their second positions, the second comb drives 902 of the other of the comb drive assemblies 896 and 897 move to their third positions, in which the comb fingers thereof are spaced apart and fully disengaged. First comb drive assemblies 896 are shown in their third positions in FIG. 12. Movable structure 906 is capable of rotating plus and minus two to ten degrees and preferably approximately six degrees in each direction, for an aggregate rotation between its extreme angular positions ranging from four to 20 degrees and preferably approximately 12 degrees.

Means is included within balanced rotary microactuator 891 for limiting the angular movement of movable structure 906 about pivot point 898. In this regard, a bumper 938 extends radially outwardly from outer platform 937 and engages one of first and second stops 939 when movable structure 906 is in either of its first and second extreme angular positions about pivot point 898.

The electrical means such as controller 561 can be utilized for driving second comb drives 902 between their first and second positions. First comb drives 901 of the first and second comb drive assemblies 896 and 897 of inner set 911 spaced farthest from radial centerline 912 and all of the first comb drives 901 of outer set 913 are electrically connected by means of leads 942 to at least one end and as shown first and second bond pads 943. The first comb drives 901 of the first and second comb drive assemblies 896 and 897 of inner set 911 spaced closest to radial centerline 912 are connected at respective inner end portions 918a to respective first and second bond pads 944 disposed between first and second springs 903 and 904. Mount 928 additionally serves as a bond pad for electrically connecting second comb drives 902 and movable structure 906 to controller 561. Means in the form of a closed loop servo control system, for example a conventional algorithm of the type discussed above, can optionally be included in controller 561 or related control electronics for measuring the capacitance between comb fingers 919 and 922 and comb fingers 932 and 934 to monitor the position of movable structure 906 relative to substrate 892.

Collimating lens 503 is coupled to movable structure 906 by means of platform 893. Specifically, first end portion 515a of lens block 515 is secured to platform 893 by any suitable means such as an adhesive (not shown). The lens block 515 is centered on radial centerline 912 of balanced rotary microactuator 891 when movable structure 906 is in its rest position shown in FIG. 11.

A counterbalance 946 is carried by substrate 892 and movable structure 906 and thus, second comb drives 902. Counterbalance 946 includes a weight 947 secured to outer platform or coupler 937 by any suitable means such as an adhesive (not shown) and thus coupled to movable structure 906 and second comb drives 902. The mass of weight 947 and its position on movable structure 906 are selected so that the center of mass of movable structure 906, lens block 515, collimating lens 503 and weight 947, in the angular direction about pivot point 848, is located substantially at the pivot point 848. Movable structure 906, lens block 515, collimating lens 503 and weight 947 are collectively referred to as the movable framework 948 of balanced microdevice 889.

In operation and use, the rotary microactuator 891 of balanced microdevice 889 can be used in substantially the same manner as microactuator 772 to move collimating lens 503 or any other suitable object. Rotation of movable structure 906 in its first and second opposite angular directions about pivot point 848 results in collimating lens 503 similarly rotating about pivot point 848. Since the amount of angular rotation of collimating lens 503 is substantially small, the upward and downward movement of the collimating lens 503 is substantially linear.

Counterbalance 946 serves to limit undesirable movements of the collimating lens 503 about the axis of rotation of microactuator 891 when external accelerations are applied to microdevice 889.

Figure 13:
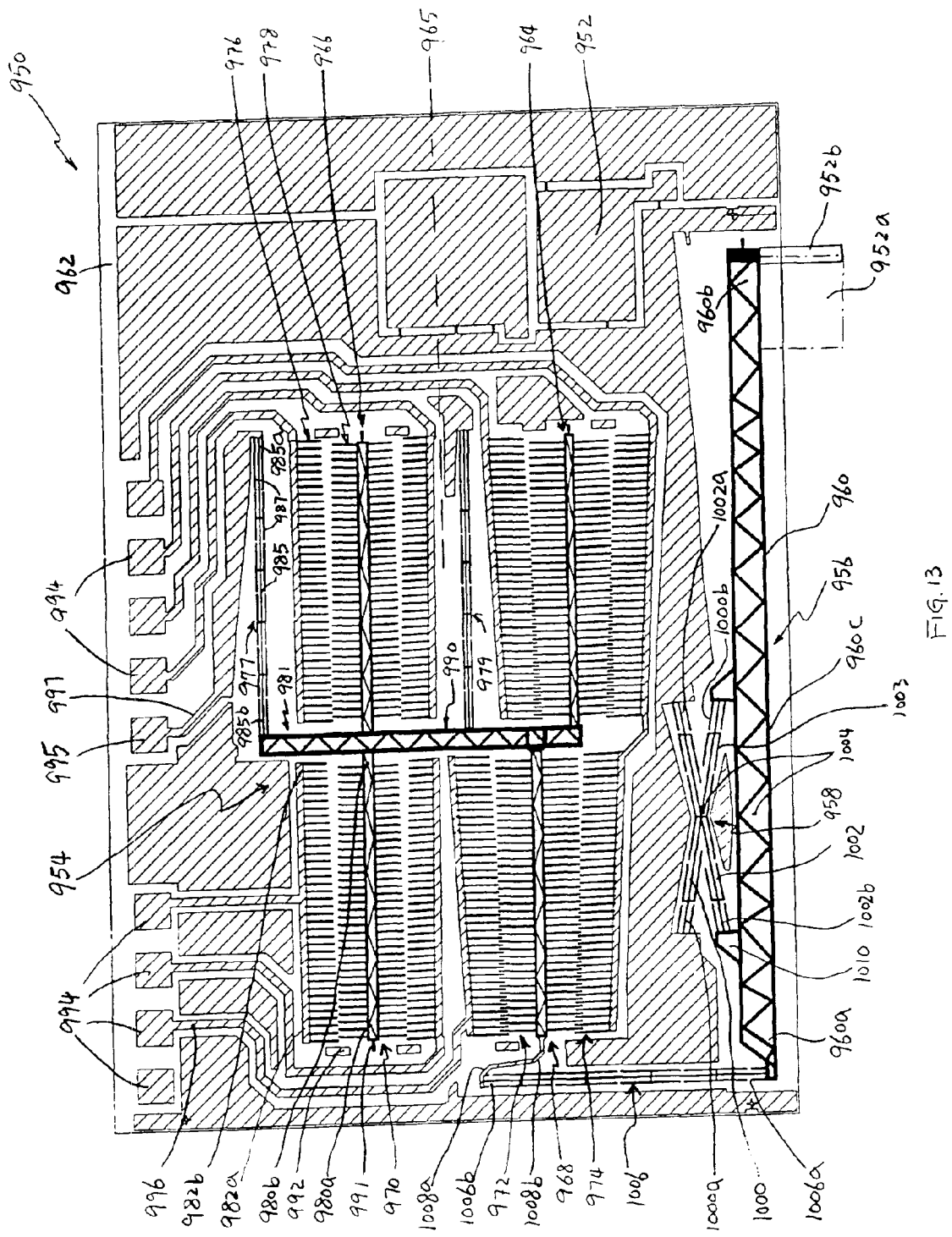
FIG. 13 is a plan view of a microdevice with lever assembly of the present invention.
Figure 14:
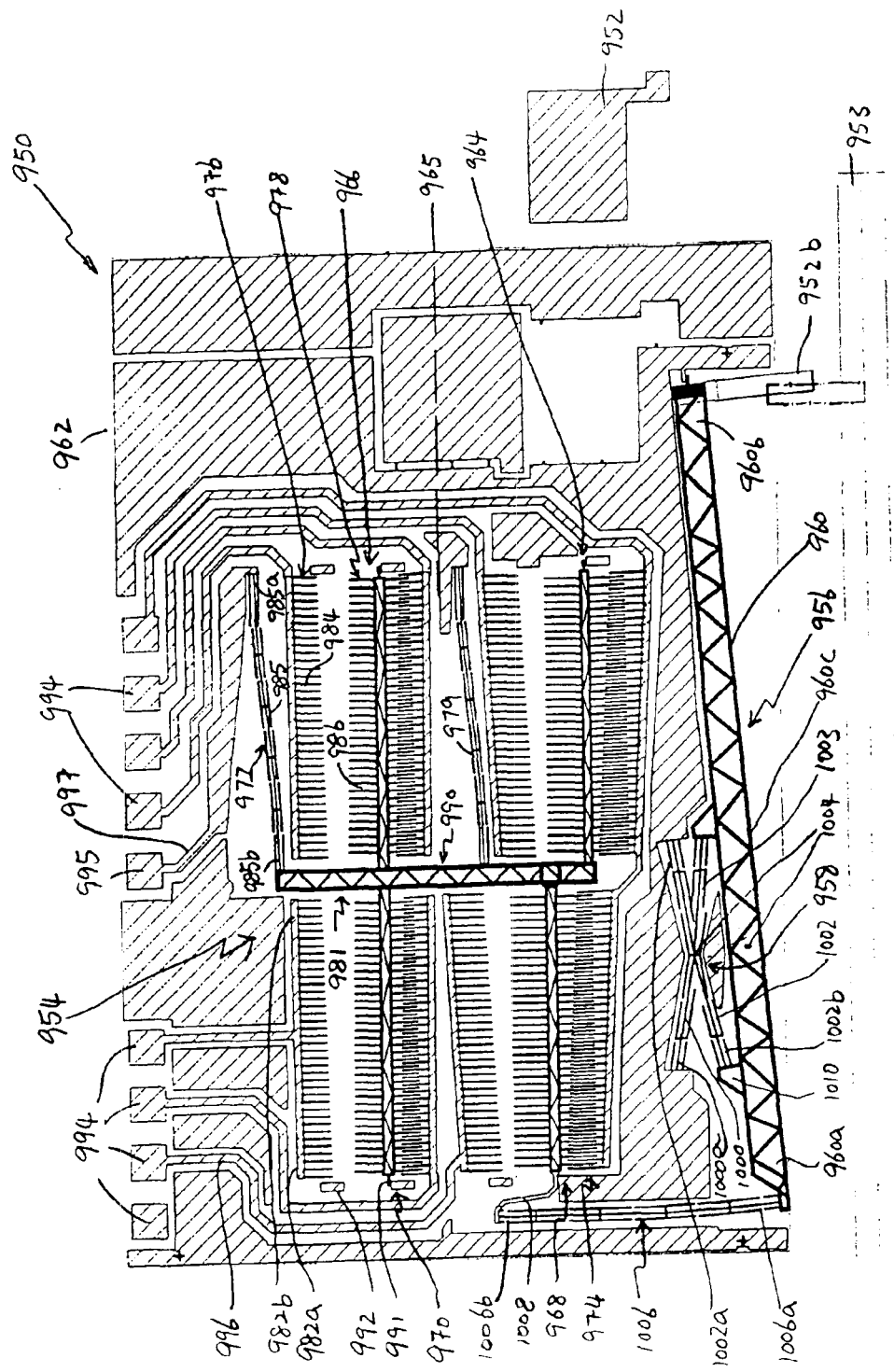
FIG. 14 is a plan view of the microdevice with lever assembly of FIG. 13 in a second position.

Another embodiment of the microdevice of the present invention is shown in FIGS. 13 and 14. Microdevice 950 shown herein, for moving any suitable object or element 952, is preferably provided with a lever assembly and is preferably balanced. In one referred embodiment, such an element 952 is an optical element such as a shutter plate or light blocking member. For example, microdevice 950 can be used as a variable optical attenuator or an on-off shutter in an optical communication system. In this regard, microdevice 950 can be part of tunable laser of the type disclosed in U.S. patent application Ser. No. 09/728,212 filed Nov. 29, 2000, the entire content of which is incorporated herein by this reference.

In general, microdevice 950 includes a microactuator 954 that serves to move the optical element 952 in a large displacement. A lever assembly 956 including a pivot 958 and lever 960 is provided to couple together microactuator 954 and optical element 952. The microdevice includes a movable portion 981 which causes lever 960 to pivot so as to move optical element 952 in a direction of travel. Element 952 is substantially mechanically balanced to inhibit undesirable movement of the element in response to externally applied accelerations or vibrations.

In one preferred embodiment, microactuator or motor 954 is preferably a MEMS-based microactuator of any suitable type and more preferably a linear electrostatic microactuator similar to microactuator 772 described above. Linear microactuator 954 can be constructed in the manner discussed above with respect to microactuator 772, atop a planar substrate 962, that is substantially similar to substrate 773 discussed above. In general, linear microactuator 954 includes at least one and preferably a plurality of first and second comb drive assemblies 972 and 974, preferably linear comb drive assemblies, which are carried by substrate 962 and arranged on substrate 962 in first, second, third and fourth sets 964 through 968. Each of the first and second comb drive assemblies 972 and 974 includes a first comb drive member or comb drive 976 mounted on substrate 962 and a second comb drive member or comb drive 978 overlying substrate 962. At least first and second spaced-apart suspension members or spring members 977 and 979 are included in microactuator 954 for supporting or suspending the second comb drives 978 over substrate 962 and for providing stiffness to second comb drives 978 in a direction along a longitudinal centerline 965 of microactuator 954.

The components of microactuator 954 are formed atop substrate 962 by a top layer or wafer substantially similar to top wafer 773 of microactuator 772. The top wafer is secured to substrate 962 in any suitable manner and is preferably fusion bonded to the substrate by means of a silicon dioxide layer (not shown). The components of microactuator 954 can be formed by any suitable means and are preferably etched from the top layer by any of techniques discussed above with respect to microactuator 772. Second comb drives 978 are part of a movable portion or structure 981 that, together with springs 977 and 979, is spaced above substrate 962 by an air gap, similar to air gap 671 discussed above with respect to first microactuator 653, so as to be electrically isolated from substrate 962.

First and second comb drive assemblies sets 964 and 966 extend parallel to each other in substantially symmetrical disposition relative to longitudinal centerline 965 of microactuator 954. Similarly, third and fourth comb drive assemblies sets 968 and 970 extend parallel to each other in substantially symmetrical disposition relative to longitudinal centerline 965 of microactuator 954. A single first comb drive assembly 972 and a single second comb drive assembly 974 are provided in each comb drive assemblies set 964 through 968. First comb drive 976 of each of first and second comb drive assemblies 972 and 974 is immovably secured to substrate 962 and has a longitudinally-extending truss or bar 981 having first and second portions 982a and 982b. A plurality of comb drive fingers or comb fingers 984 extend from one side of bar 982 in longitudinally spaced-apart positions along the length of the bar.

Second comb drives 978 are spaced above substrate 962 so as to be movable relative to the substrate and first comb drives 976. The second comb drives 978 have a construction similar to first comb drives 976 and, more specifically, are each formed with a longitudinally-extending truss or bar 980 having first and second end portions 980a and 980b. The second comb drives 978 of each set 964 through 970 are disposed back-to-back and, as such, share a bar 980. A plurality of comb drive fingers or comb fingers 986 extend from each side of each bar 980 to form the back-to-back second comb drives 978 of each set. The comb fingers 986 on each side of bar 980 are longitudinally spaced apart along the length the bar 980.

Comb fingers 984 and 986 are substantially similar in construction. Each of the comb fingers 984 and 986 are preferably of the type disclosed in U.S. Pat. No. 6,384,510 and as such are inclined and offset. As more fully disclosed in U.S. Pat. No. 6,384,510, each of the comb fingers 984 and 986 is slightly inclined from a line extending normal to the respective bar 980 and 982. In addition, when each of the comb drive assemblies 972 and 974 is in its rest position, movable comb fingers 986 are offset relative to a midpoint line extending between the adjacent pair of stationary comb fingers 984 into which such comb fingers 986 interdigitate.

First and second springs 977 and 979 are substantially similar in construction to springs 783 and 784 discussed above and each include a single spring member 985 and first and second sacrificial bars 987 extending parallel to the spring member along each of the opposite sides of the spring member. Each of springs 977 and 979 has a first end portion 985a and an opposite second end portion 985b. First end portion 985a of each spring members is coupled or secured to substrate 962 and second end portion 985b of each spring member is coupled to second comb drives 978. In this regard, an elongate bar or shuttle 990 is secured to the free second end portion 985b of each spring member. Shuttle 990 extends substantially perpendicular to springs 977 and 979 when the springs are in their rest positions shown in FIG. 13. The second end portion 980b of each movable bar 980 of the second comb drives 978 is perpendicularly joined to shuttle 990.

Shuttle 990 is part of the movable structure 981 of microactuator 954. In particular, first and second comb drive assembly sets 964 and 966 are disposed on one same side of shuttle 990 in substantially symmetrical disposition with respect to the centerline 965 of microactuator 954. Third and fourth comb drive assembly sets 968 and 970 are disposed on the opposite side of shuttle 990 in substantially symmetrical disposition with respect to centerline 965 of microactuator 954.

Second comb drives 978 of each of first and second comb drive assemblies 972 and 974 are movable in a first direction from their first or intermediate positions shown in FIG. 13, in which comb fingers 984 and 986 are not substantially fully interdigitated, to a second position, in which the comb fingers are substantially fully interdigitated. The second comb drives 978 are also movable from their first position in an opposite second direction to a third position (not shown), in which the comb fingers 984 and 986 are spaced apart and fully disengaged.

First and second flexible springs 977 and 979 permits each of the movable comb drives 978 to move from a first or rest position shown in FIG. 13, in which comb fingers are not substantially fully interdigitated, to a second or actuated position shown in FIG. 14, in which comb fingers are substantially fully interdigitated. As used herein, the term "not substantially fully interdigitated" is broad enough to cover comb fingers which are fully disengaged as well as comb fingers which are partially interdigitated. Movement of second comb drives 978 to their respective second positions causes shuttle 990 to move substantially in a linear direction of travel relative to substrate 962.

Electrical means is included for driving second comb drives 978 and the remainder of movable structure 981 between their first and second positions. Such electrical means includes a controller, such as controller 561. An electrical lead or trace 996 extends from each first comb drive 972 to a bond pad 994 for permitting electrical control signals to be selectively supplied to appropriate first comb drives 972. An additional electrical lead or trace 997 extends from the first end portion 985a of spring member 977 to a bond pad 995 for permitting electrical control signals to be supplied to the movable second comb drives 978. Means in the form of a closed loop servo control system, such as the conventional algorithm discussed above, can optionally be included in controller or related control electronics for measuring the capacitance between comb fingers 984 and 986 to monitor the position of the second comb drives 978 of microactuator 954.

Lever assembly 956 is coupled to microactuator 954 and includes a pivot assembly or pivot 958 and a lever arm or lever 960. Pivot or pivot assembly 958 is X-shaped in conformation when viewed in plan and is formed from first and second pivot arms 1000 and 1002 which are joined at their center to form a pivot point 1004 of the pivot assembly 958. Each of pivot arms 1000 and 1002 has a first end portion 1000a and 1002a joined to substrate 962 in spaced-apart positions and a second end portion 1000b and 1002b joined to lever arm 960 in spaced-apart positions. Each of the pivot arms 1000 and 1002 is capable of bending or flexing and preferably has a cross-sectional configuration, both in shape and dimensions, similar to springs 977 and 979. Sacrificial bars 1003, similar to sacrificial bars 987 discussed above, optionally extend along the side of pivot arms for ensuring even etching of the desired rectangular cross section of the pivot arms. Pivot assembly 958 permits lever 960 to pivot about pivot point 1004 in both clockwise and counterclockwise directions from a first or rest position shown in FIG. 13 to a second or actuated position shown in FIG. 14.

The elongate and substantially rigid lever 960 has a first extremity 960a coupled to microactuator 954 through flexural member 1006, an opposite second extremity 960b coupled to an optical element 952, and a third or central portion 960c coupled to pivot assembly 958. Third portion 960c of lever 960 includes two extensions or couplers 1010 for coupling to second end portions 1000b and 1002b of each of first and second pivot arms 1000 and 1002 respectively. Lever 960 has a first length from the first extremity 960a to pivot point 1004 and a second length from the second extremity 960b to the pivot point 1004. The ratio of the second length to the first length can be adjusted to permit suitable displacement of optical element 952 in both clockwise and counterclockwise directions. In one preferred embodiment, the first length is approximately 1100 microns and the second length is approximately 2500 microns. Such dimensions provide a lever ratio of about 2.3, that is optical element 952 will translate 2.3 times of the travel distance of shuttle 990. Microactuator 954 permit shuttle 990 to travel at least a distance of approximately 90 microns in both forward and rearward directions, and thus moving element 952 in a direction of travel through a distance at least 200 microns in both clockwise and counterclockwise directions.

Flexible or bendable member 1006 is provided to couple first extremity 960a of lever 960 to microactuator 954. Specifically, the elongate and substantially linear coupler 1006 has first end portion 1006a joined to first extremity 960a of lever 960 and an opposite second end portion 1006b joined to movable structure 982 of microactuator 954. Coupler 1006 preferably has a cross sectional configuration, including width and thickness, similar to the configuration of springs 977 and 979 so as to permit bending thereof during movement of lever 960. A rigid member 1008 is provided to couple flexible member 1006 to microactuator 954. Specifically, rigid member 1008 is Z-shaped in conformation when viewed in plan and has first end portion 1008a coupled to second end portion 1006b of flexural member 1006 and second end portion 1008b coupled to bar 980 of second comb drive 978 of third comb drive assemblies set 968.

Movable components of microdevice 954 are substantially mechanically balanced to inhibit undesirable movement of element 952 in the direction of travel of element 952 in response to externally applied forces to microdevice 950. In this regard, mass of movable structure 981 of microactuator 954, lever 960, and element 952 of microdevice 950 are adjusted so that the torque in the clockwise direction about pivot point 1004 of pivot assembly 958 is substantially equal to the torque in the counterclockwise direction about such pivot point. Any means can be utilized to adjust the dimensions and mass of the movable components of microdevice 950 to achieve such mechanical balancing. For example, a counterbalance such as a weight or mass (not shown) can be attached to such movable components. Such a counterbalance is preferably carried by lever arm 960.

Element 952 can be any optical element such as a light blocking element, shutter, lens, and filter. In one preferred embodiment, element 952 is a shutter plate fabricated on substrate 962 during fabrication of other components of microdevice 950. As shown in FIGS. 13 and 14, shutter plate 952 has a generally planar rectangular attenuation surface, however, the shape and the topography of the attenuation surface can be modified to provide the desired level of attenuation and minimize power consumption. Shutter plate 952 as fabricated can be mounted to second extremity 960b of lever 960 by any suitable means. In one preferred embodiment, shutter plate 952 (shown as 952b in FIGS. 13 and 14) is coupled to lever 960 in a plane substantially perpendicular to the plane of substrate 962. As such, shutter plate 952b can attenuate an optical beam 953 that lies in a plane parallel to the plane of substrate 962 and travels in a path substantially perpendicular to the plane of the shutter disposition when in rest position, as shown in FIG. 14. Shutter plate 952 (shown as 952a in phantom lines in FIG. 13) can also be coupled to lever 960 in a plane parallel to the plane of substrate 962 shown in FIG. 13 so as to at least partially overlie an opening (not shown) defined by substrate 962. This disposition of shutter plate 952a attenuates an optical beam that passes through the opening in the substrate 962.

In operation and use, microactuator 954 is electrically controlled by controller 561 to drive shuttle 990 in a forward direction (a downward direction in FIG. 13) from its rest position shown in FIG. 13 to its actuated position shown in FIG. 14. Such movement of shuttle pushes flexural member 1006 forward which in turn rotates lever 960 in a counterclockwise direction about pivot point 1004 so as to pull element 952 in a rearward direction (an upward direction in FIG. 14) to a second position shown in FIG. 14. Similarly, microactuator 954 can be electrically controlled by controller 561 to pull shuttle 990 in a rearward direction (an upward direction in FIG. 13) from its rest position shown in FIG. 13 to a second position (not shown). Such movement of shuttle 990 pulls flexural member 1006 rearwardly which in turn rotates lever 960 in a clockwise direction about pivot point 1004 so as to push optical element 952 in a forward direction to a second position. In both instances, bendable flexural member 1006 and pivot arms 1000 and 1002 accommodate the pivoting of lever 960 about pivot point 1004. The pivoting of lever 960 about pivot point 1004 in both clockwise and counterclockwise directions allows optical element 952 coupled to the second extremity 960b of lever 960 to move in both clockwise and counterclockwise directions. Stop 1006 is provided on substrate 962 to limit the maximum travel of lever 960. The precise and variable control of motor 954 allows shutter plate 952 to dynamically attenuate the optical beam over the entire circular region of the beam or any predetermined portion of the beam.

The microdevice 950 of the present invention is suitable for use either as a variable optical attenuator or as an on-off shutter in an optical communication system. As such the microdevice of the present invention is advantageous over the prior art microdevices which have limitations in ability to divert all or portion of the optical beam and is susceptible to external accelerations or vibrations. The microdevice of the present invention is substantially mechanically balanced and thus provides the variable optical attenuator or shutter with substantial immunity to undesirable externally applied forces. Further, by adjusting the lever ratio of the device, the deflection of the device can be controlled. In one embodiment of the invention, the lever of the device is pivotable about the pivot point through an angle of at least five degrees in both clockwise and counterclockwise directions and the light blocking element or shutter plate is movable in the direction of travel through a distance of at least 200 microns in both clockwise and counterclockwise directions. The ability of large deflections allows the microdevice to be used in relatively large collimated, converging, or diverging optical beams, which results in reduced insertion loss compared to prior art devices. This is particularly useful in a tunable laser system employing an external cavity laser design where the output beam from such a system usually has a diameter of about 150 microns. Allowing for alignment tolerances, the output beam can be located in a circular region about 200 microns or more in diameter. To provide an attenuator for such a laser system, a shutter with a travel of at least 200 microns is desirable. The microdevice of the present invention can provide large structure deflections at least about 200 microns in both clockwise and counterclockwise directions and is thus suitable for use in such tunable laser systems. The microdevice of the present invention can be scaled larger or smaller to any suitable size so as to provide a low cost solution for commercial applications.

The microdevice of the present invention are not limited for use in tunable lasers, the telecommunications industry or optical apparatus, it being appreciated that the microdevice and microactuators disclosed herein can be used in a wide range of applications, in addition to those discussed herein, to move any suitable element or member. It should also be appreciated by those skilled in the art that it would be possible to modify the size, shape, appearance and methods of manufacture of various elements of the invention, or to include or exclude various elements, and stay within the scope and spirit of the present invention.

What is claimed is:

1. A microdevice comprising a substrate, a movable structure overlaying the substrate, an element and a lever assembly having a pivot and a lever coupled to and pivotable about the pivot, the lever having a first extremity coupled to the movable structure and an opposite second extremity coupled to the element whereby the movable structure causes the lever to pivot about the pivot so as to move the element in a direction of travel and the element is substantially counterbalanced relative to the movable structure to inhibit undesirable movement of the element in the direction of travel in response to externally applied forces.

2. The microdevice of claim 1 wherein the pivot has an X-shape configuration and is formed from bendable first and second pivot arms, each of the first and second pivot arms having a first end portion coupled to the substrate and a second end portion coupled to the lever, the first and second pivot arms having respective central portions that are coupled together to form a pivot about which the lever pivots.

3. The microdevice of claim 2 wherein the lever has a first length from the first extremity to the pivot point and a second length from the second extremity to the pivot point, the ratio of the second length to the first length ranging from two to three.

4. The microdevice of claim 1 further comprising an elongated flexural member for coupling the movable structure to the first extremity of the lever.

5. The microdevice of claim 1 wherein the movable structure includes a comb drive member.

6. The microdevice of claim 5 wherein the comb drive member is a linear comb drive member.

7. The microdevice of claim 1 wherein the element is an optical element.

8. The microdevice of claim 7 wherein the optical element is a light blocking member.

9. The microdevice of claim 1 wherein the element pivots about a pivot axis extending perpendicular to the substrate.

10. The microdevice of claim 1 wherein the element moves in a plane parallel to the plane of the movable structure.

11. A microdevice for use with a laser providing an optical beam comprising a substrate, a light-blocking element, a drive member overlying the substrate and a lever assembly having a pivot and a lever coupled to and pivotable about the pivot, the lever having a first extremity coupled to the drive member and an opposite second extremity coupled to the light-blocking element whereby the drive member causes the lever to pivot about the pivot so as to move the light-blocking element in a direction of travel to block at least a portion of the optical beam and a counterbalance coupled to the light-blocking member for inhibiting undesirable movement of the light-blocking element in the direction of travel in response to externally applied forces.

12. The microdevice of claim 11 wherein the pivot is X-shaped.

13. The microdevice of claim 11 wherein the drive member is a comb drive member.

14. The microdevice of claim 11 wherein the drive member is an electrically-driven drive member.

15. The microdevice of claim 11 wherein the lever pivots about a pivot axis extending perpendicular to the substrate.

16. A microdevice comprising a substrate extending in a first plane, a movable element, a microelectromechanical drive member overlying the substrate, a lever assembly having a pivot and a lever coupled to and pivotable about the pivot in a second plane extending substantially parallel to the first plane, the lever having a first extremity coupled to the drive member and a second extremity coupled to the element whereby the drive member causes the lever to pivot about the pivot so as to move the element in a direction of travel, and a counterbalance coupled to the element for inhibiting undesirable movement of the element in a direction of travel in response to externally applied forces.

17. The microdevice of claim 16 wherein the drive member is a comb drive member.

18. The microdevice of claim 1, wherein the substrate extends in a first plane and the lever is pivotable about the pivot in a second plane extending substantially parallel to the first plane.

19. A microdevice comprising a substrate, first and second movable structures overlaying the substrate, and a lever assembly having a pivot and a lever coupled to and pivotable about the pivot, the lever having a first extremity coupled to the first movable structure and an opposite second extremity coupled to the second movable structure whereby the first movable structure causes the lever to pivot about the pivot so as to move the second movable structure in a direction of travel, the second movable structure being substantially counterbalanced relative to the first movable structure to inhibit undesirable movement of the first movable structure in the direction of travel in response to externally applied forces.

20. The microdevice of claim 19 wherein the first movable structure includes an electrically-driven drive member.

21. The microdevice of claim 19 wherein the first movable structure includes a first electrically-driven drive member and the second movable structure includes a second electrically-driven drive member.

22. The microdevice of claim 19 wherein the first movable structure includes a comb drive member.

23. The microdevice of claim 19 wherein the first movable structure includes a first comb drive member and the second movable structure includes a second comb drive member.

24. The microdevice of claim 19 wherein the first movable structure extends in a first plane and the second movable structure moves in a second plane parallel to the first plane.

* * * * *